United States Patent
Niu et al.

(10) Patent No.: US 11,839,864 B2
(45) Date of Patent: Dec. 12, 2023

(54) HUMIC ACID TYPE ADSORPTION MATERIAL AS WELL AS PREPARATION METHOD AND APPLICATION THEREOF

(71) Applicant: Shaanxi University of Science & Technology, Xi'an (CN)

(72) Inventors: Yuhua Niu, Xi'an (CN); Xingxing Han, Xi'an (CN); Liangxian Huang, Xi'an (CN); Yonghui Sun, Xi'an (CN); Jie Song, Xi'an (CN); Xiaobin Zhu, Shenmu County (CN); Yangyang Wang, Yulin (CN); Xuan Zhao, Xi'an (CN)

(73) Assignee: Shaanxi University of Science & Technology, Xi'an (CN)

( * ) Notice: Subject to any disclaimer, the term of this patent is extended or adjusted under 35 U.S.C. 154(b) by 136 days.

(21) Appl. No.: 17/384,924

(22) Filed: Jul. 26, 2021

(65) Prior Publication Data
US 2022/0040672 A1 Feb. 10, 2022

(30) Foreign Application Priority Data
Aug. 7, 2020 (CN) .......................... 202010791381.5

(51) Int. Cl.
*B01J 20/24* (2006.01)
*C08H 7/00* (2011.01)
(Continued)

(52) U.S. Cl.
CPC .............. *B01J 20/02* (2013.01); *B01J 20/22* (2013.01); *C08H 6/00* (2013.01); *B01J 2220/4825* (2013.01); *B01J 2220/4837* (2013.01)

(58) Field of Classification Search
CPC .................................... B01J 20/22; C08H 6/00
See application file for complete search history.

(56) References Cited

U.S. PATENT DOCUMENTS

2017/0233265 A1   8/2017  Al-Ahmed et al.
2020/0095384 A1*  3/2020  Kudo .................. C08K 3/36

FOREIGN PATENT DOCUMENTS

CN     101942167 A        1/2011
CN     105693952 A  *     6/2016
(Continued)

OTHER PUBLICATIONS

Xie et al. (J. Polym. Res. 2009, 16, 143-150) (Year: 2009).*
(Continued)

*Primary Examiner* — Liam J Heincer

(57) ABSTRACT

The invention discloses a humic acid type adsorption material as well as a preparation method and application thereof. The humic acid type adsorption material is prepared by taking carboxymethyl cellulose or salts thereof, humate and montmorillonite as raw materials and adding a monomer, a cross-linking agent and an initiator through aqueous solution polymerization. The synthesized porous material is great in specific surface area, can quickly get close to water molecules in water to form hydrogen bonds, and finally achieves the purpose of removing organic dye pollutants through electrostatic attraction effect with dye molecules. The humic acid type adsorption material is low in raw material price, is simple in synthesis process, and is green and environmentally friendly.

7 Claims, 21 Drawing Sheets

(51) Int. Cl.
  *B01J 20/22* (2006.01)
  *B01J 20/02* (2006.01)

(56) References Cited

FOREIGN PATENT DOCUMENTS

| CN | 105693952 A | 6/2016 |
| CN | 109806847 A | 5/2019 |
| CN | 111250060 A | 6/2020 |

OTHER PUBLICATIONS

Rashidzadeh et al. (Carbohydrate Polymers 114, 2014, 269-278) (Year: 2014).*

ZHANG Wenrui, Research on Adsorption/Desorption Properties by Lignocellulose Based Nanocomposite Adsorbent for Dye, http://www.cnki.net,.

* cited by examiner

HUMIC ACID TYPE ADSORPTION MATERIAL AS WELL AS PREPARATION METHOD AND APPLICATION THEREOF

CROSS REFERENCE TO RELATED APPLICATION

The invention belongs to the technical field of material preparation and environmental science, and specifically relates to a humic acid type adsorption material as well as a preparation method and application thereof.

BACKGROUND OF THE INVENTION

In today's society, environmental pollution, energy shortage and other issues have become hot spots catching widespread attention of the society. Due to the rapid development of textiles, leather, food processing, pharmaceuticals, cosmetics and paper industry, dyes have become one of the most prominent pollutants causing wastewater pollution. These dye wastes are dangerous, toxic, non-biodegradable, and some can even cause cancers while some can cause headaches, skin allergies, and even affect the normal function of the liver, not only causing huge environmental pollution problems, but also leading to a lot of waste of water resources. The development of a new, green, environmentally-friendly, efficient and specific adsorption material is imperative to solve the problem of organic dye pollution.

Traditional methods for removing dye wastewater include biodegradation, coagulation, chemical oxidation, membrane filtration, ion exchange and photocatalysis. However, these treatment methods have not been widely promoted because of the high processing cost, strict condition requirements, and secondary pollution. Among these technologies, the adsorption treatment method has been widely used in the treatment of organic dye pollution because of its simple treatment operation, low cost, and no secondary pollution. Hydrogel adsorption materials provide numerous active adsorption sites for the removal of pollutants due to the numerous functional groups in their structures. The hydrogel absorbs water to swell and does not dissolve, providing a convenient way for the separation of adsorbent and adsorbate.

Traditional hydrogels are low in adsorption capacity and removal rate, and poor in selectivity, and most of them cannot be reused, failing to meet the requirements for the removal of organic dyes in actual production; and moreover, the synthetic raw materials of traditional hydrogels are highly toxic, the synthesis method is complicated, and the synthesis process technical requirements and the cost are high.

SUMMARY OF THE INVENTION

In order to overcome the above-mentioned shortcomings in the prior art, the objective of the invention is to provide a humic acid type adsorption material as well as a preparation method and application thereof. The preparation method is simple process, adopts easily available raw materials and is low in cost, and the prepared adsorption material is high in adsorption capacity and removal rate, has selectivity for treatment of organic dyes, can be recycled, and can be finally degraded, meeting the requirements of actual production.

The invention adopts the following technical scheme:

The invention discloses a preparation method for a humic acid type adsorption material, including the following steps:

step 1: weighing humate, montmorillonite, acrylic acid and carboxymethyl cellulose or salts thereof in a mass ratio of (0.01-0.15): (0.03-0.15): (2-6): (0.05-0.14) to separately prepare a humate solution, a montmorillonite water dispersion solution, an acrylic acid solution and a carboxymethyl cellulose solution or a salt solution thereof;

step 2: stirring and uniformly mixing the humate solution, the montmorillonite water dispersion solution and the carboxymethyl cellulose solution or the salt solution thereof under a heating condition to form a system A; adding a crosslinking agent into the acrylic acid solution to form a system B;

step 3: dropping the system B and an initiator into the system A, continuing to stir after the addition is completed, and continuing to stir after the temperature rises to obtain a viscous gel material;

and step 4: performing freezing-thawing treatment on the viscous gel material obtained in step 3 for several times, and finally freeze-drying to obtain a humic acid type adsorption material.

Preferably, the carboxymethyl cellulose salt is sodium carboxymethyl cellulose or potassium carboxymethyl cellulose, the humate is sodium humate or potassium humate, and the montmorillonite is sodium-based montmorillonite or calcium-based montmorillonite.

Preferably, in step 2, heating to 55-65° C., and the stirring speed is 100-150 r/min.

Preferably, the crosslinking agent is N, N'-methylenebisacrylamide.

Preferably, the initiator is ammonium persulfate or potassium persulfate.

Preferably, in step 3, the first stirring lasts for 20-40 min with a rotation speed of 100-150 r/min at 55-65° C.; and second stirring lasts for 2-4 h with a rotation speed of 100-150 r/min at 70° C.

Preferably, in the step 3, a dropping rate of the system B is 3-5 drops/s, and the dropping rate of the initiator is 2-4 drops/s.

Preferably, during the freezing-thawing treatment, the freezing time is 8-12 h, the thawing time is 6-10 h, and the number of freezing-thawing treatment is 3-5.

The invention also discloses a humic acid type adsorption material prepared by the above preparation method.

The invention also discloses an application of the above-mentioned humic acid type adsorption material in removing organic dye pollutants.

Compared with the prior art, the invention has the following beneficial technical effects:

The preparation method of the humic acid type adsorption material of the invention utilizes polymerization of an aqueous solution to cross-link carboxymethyl cellulose or salt thereof with humic acid and montmorillonite through acrylic acid to form a porous hydrogel material, and the adsorption material can be quickly polymerized without a nitrogen environment in case of adding the initiator and the crosslinking agent. After several freezing-thawing treatments, it is beneficial to the formation of the pore structure of the humic acid type adsorption material, increasing the specific surface area of the material, and improving the subsequent treatment effect of organic dyes. Finally, the pore structure of the material is maintained by freeze-drying to finally obtain a humic acid type adsorption material with a porous structure. According to the humic acid type adsorption material with the porous structure synthesized by the method, numerous carboxyl active groups capable of forming carboxylate radicals in the raw materials and hydroxyl groups capable of forming hydrogen bonds in the montmorillonite structure, which can be quickly close to water molecules in water, are utilized to achieve the purpose of removing organic dye pollutants through electrostatic attraction effect of the carboxylate radicals and dye molecules. Meanwhile, a place is provided for adsorption of organic dyes by utilizing a layered structure and a huge specific surface area of montmorillonite. The synthetic raw materials are low in price, the synthetic process is simple, the reaction condition requirements are low, the operability is high, and the synthesized product is environmentally friendly and has a good application prospect. Further, sodium carboxymethyl cellulose or potassium carboxymethyl cellulose is used as carboxymethyl cellulose salt, sodium humate or potassium humate is used as humate, and sodium-based montmorillonite or calcium-based montmorillonite is used for montmorillonite. The above raw materials have good solubility and uniform dispersion, which are beneficial to the progress of the reaction.

Further, the temperature during stirring in step 2 is 55-65° C., and the rotation speed is 100-150 r/min, so that the raw materials are mixed uniformly, and the temperature of the entire system is uniform, providing favorable conditions for the subsequent addition and reaction of the initiator and the crosslinking agent.

Furthermore, N, N'-methylenebisacrylamide is used as the crosslinking agent, which is a common crosslinking agent with a low price, easy availability and stable reaction.

Further, the initiator adopts ammonium persulfate or potassium persulfate, which is a commonly used initiator with mild initiation conditions, stable reaction, a low price and easy availability.

Further, in the step 3, first stirring lasts for 20-40 min, so that the initiator slowly decomposes to form free radical to initiate the preliminary reaction. If the stirring time is too short, the raw materials will not have sufficient contact with the initiator and crosslinking agent, or cause a local reaction, so that the reaction proceeds sufficiently. If the stirring time is too long, the initiator is completely decomposed, and the subsequent reaction time is too long. Second stirring lasts for 2-4 h while the temperature rises to 70° C. A more suitable temperature for this reaction is 70° C., the specific reaction time is related to the amount of initiator and crosslinking agent added in the early stage and the set temperature during dripping.

Furthermore, system B and initiator are added dropwise to system A at a rate of 3-5 drops/s and 2-4 drops/s respectively. The addition of initiator and crosslinking agent should not be too fast as this reaction is a free radical polymerization. In the reaction, if the initiator is added too fast, too many free radicals are generated to initiate the reaction too violently, and the compact structure formed between the raw materials under the action of the crosslinking agent is not conducive to the subsequent removal of the dyes. When the dropping rate is too slow, the initiator produces too few free radicals to not initiate the polymerization reaction, which will affect the progress of the reaction or even fail to completely polymerize for forming an adsorption material.

Further, freezing lasts for 8-12 h each time, and thawing lasts for 6-10 h. The freezing and thawing operation is conducive to the formation of a porous structure of the adsorption material, increasing the specific surface area of the material, and facilitating the subsequent removal of organic dyes. The number of cycles of freezing-thawing treatment is 3-5. If the number of freezing-thawing cycles is too small, the number of porous structures formed by the material is small and uneven; if the number of freezing-thawing cycles is too great, the porous structure of the material will change, and the entire preparation period is too long.

The humic acid type adsorption material prepared by the above preparation method has a porous structure, has a large specific surface area, can be recycled, is environmentally friendly, and is degradable.

When applied to remove organic dye pollutants, the above-mentioned humic acid type adsorption material has significant adsorption performance, can efficiently and specifically remove organic dye pollutants when placed in the organic dyes, is remarkable in removal effect for organic dyes taking methylene blue (MB) as a simulated pollutant, can remove pollutants in an acidic environment, has specificity for the removal of methylene blue dye, can finally be degraded in an aqueous solution with pH=8-10 without secondary hazards, and has a good application prospect.

DETAILED DESCRIPTION OF THE PREFERRED EMBODIMENTS

According to a preparation method for an efficient, selectable and degradable humic acid type adsorption material disclosed by the invention, the humic acid type adsorption material is prepared by taking carboxymethyl cellulose (CMC) or carboxymethyl cellulose salt (carboxymethyl cellulose salt is sodium carboxymethyl cellulose (SCMC) or potassium carboxymethyl cellulose (PCMC), humate (humate is sodium humate (SHA) or potassium humate (KHA)) and montmorillonite (montmorillonite is sodium-based MMT (SMMT) or calcium-based montmorillonite (CMMT)) as raw materials and taking acrylic acid (AA) as a monomer, N,N'-methylenebisacrylamide (MBA) as a crosslinking agent, ammonium persulfate (APS) or potassium persulfate (KPS) as an initiator through aqueous solution polymerization.

Figure 1:
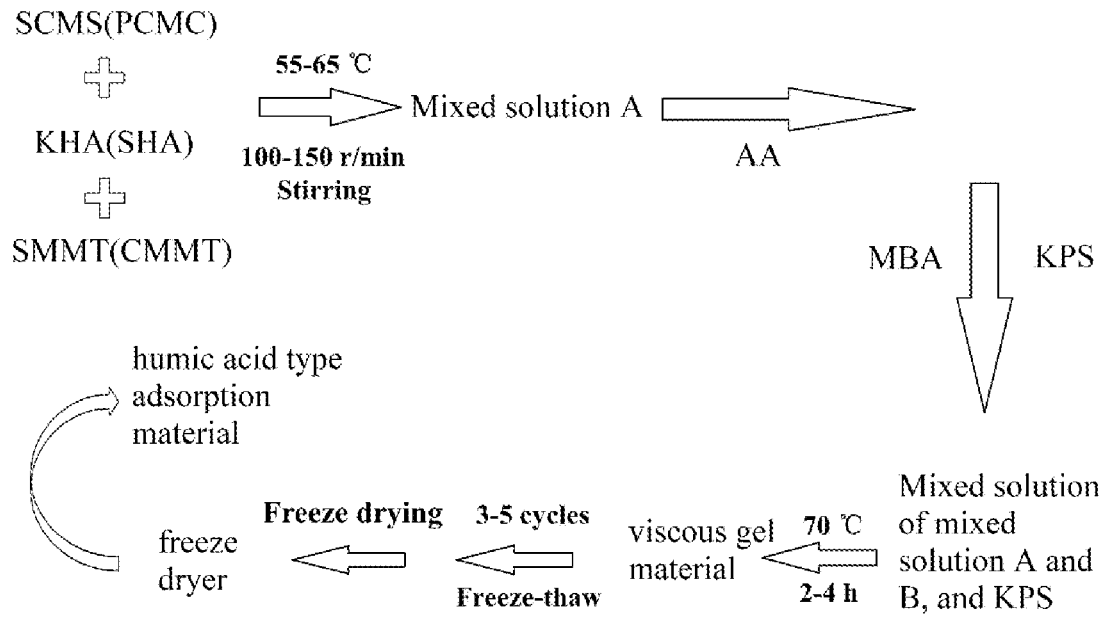
FIG. 1 is a flow chart of the preparation method of the humic acid type adsorption material of the invention.

As shown in FIG. 1, the preparation method specifically includes the following steps:

step 1, separately preparing a 0.5-0.7% carboxymethyl cellulose solution or a salt solution thereof, a 0.1-1.5% humate solution, a 0.5-1.5% montmorillonite aqueous dispersion solution, an acrylic acid solution with a neutralization degree of 20-60%, a N, N'-methylenebisacrylamide solution and an ammonium persulfate or potassium persulfate solution;

step 2, uniformly mixing 10-20 g of 0.5-0.7% carboxymethyl cellulose solution or the salt solution thereof, 10 g of 0.1-1.5% humate solution and 6-10 g of 0.5-1.5% montmorillonite aqueous dispersion solution with a rotation speed of 100-150 r/min at 55-65° C. to obtain a mixed solution A;

step 3, adding 10 g of 0.2-0.5% N, N'-methylenebisacrylamide solution into 10 g of the acrylic acid solution with a neutralization degree of 20-60% to form a mixed solution B, dripping the mixed solution B into the mixed solution A in the step 2 at a rate of 3-5 drops/s, and dripping 10 g of 0.4-1.0% ammonium persulfate or potassium persulfate solution into the mixed solution A in step 2 at a rate of 2-4 drops/s;

step 4, after the solution in step 3 is dripped, continuing mechanical stirring for 20-40 minutes, rising the temperature to 70° C., and continuing the stirring for 2-4 hours to obtain a viscous gel material;

and step 5, freezing the gel material in step 4 at −4° C. for 12 h, then thawing at room temperature for 12 h, freezing and thawing 3-5 times under the same conditions and operations, and then putting the gel material in a freeze dryer to freeze-dry, thereby obtaining the efficient, selectable and degradable humic acid type adsorption material.

The efficient, selectable and degradable humic acid type adsorption material obtained by the invention can be used for the treatment of sewage containing organic dyes. It is specific to the removal of methylene blue dye. After absorbing the organic dyes, it can be soaked in 0.1 mol/L $HNO_3$ solution to achieve the purpose of collecting the organic dyes. At the same time, a renewable adsorption material is obtained, which can be further dried after being dried. After being repeatedly used, the humic acid type adsorption material can finally be degraded in an aqueous solution with pH=8-10 without secondary harm.

The invention will be further described in detail below in conjunction with specific embodiments, which are for explanation rather than limitation of the invention.

Embodiment 1

10 g of 0.5% carboxymethyl cellulose solution, 10 g of 0.1% sodium humate solution and 6 g of 0.5% sodium-based montmorillonite aqueous dispersion solution were uniformly mixed with a rotation speed of 100 r/min at 55° C. to obtain a mixed solution A; 10 g of 0.2% N,N'-methylenebisacrylamide solution was added into 10 g of the acrylic acid solution with a neutralization degree of 20% to form a mixed solution B, the mixed solution B was dripped into the mixed solution A at a rate of 3 drops/s, and 10 g of 0.4% ammonium persulfate was dripped into the mixed solution A at a rate of 2 drops/s; after the solution was dripped, mechanical stirring was continued for 20 min, the temperature was risen to 70° C., and the stirring was continued for 2 h to obtain a viscous gel material; the gel material was frozen at −4° C. for 12 h, then thawed at room temperature for 6 h, frozen and thawed 3 times under the same conditions and operations, and then the gel material was put in a freeze dryer to freeze-dry to obtain the humic acid type adsorption material.

Embodiment 2

15 g of 0.6% carboxymethyl cellulose solution, 10 g of 0.8% potassium humate solution and 8 g of 1.0% calcium-based montmorillonite aqueous dispersion solution were uniformly mixed with a rotation speed of 125 r/min at 60° C. to obtain a mixed solution A; 10 g of 0.3% N,N'-methylenebisacrylamide solution was added into 10 g of the acrylic acid solution with a neutralization degree of 40% to form a mixed solution B, the mixed solution B was dripped into the mixed solution A at a rate of 4 drops/s, and 10 g of 0.7% ammonium persulfate was dripped into the mixed solution A at a rate of 3 drops/s; after the solution was dripped, mechanical stirring was continued for 30 min, the temperature was risen to 70° C., and the stirring was continued for 3 h to obtain a viscous gel material; the gel material was frozen at −4° C. for 12 h, then thawed at room temperature for 8 h, frozen and thawed 4 times under the same conditions and operations, and then the gel material was put in a freeze dryer to freeze-dry to obtain the humic acid type adsorption material.

Embodiment 3

20 g of 0.7% carboxymethyl cellulose solution, 10 g of 1.5% sodium humate solution and 10 g of 1.5% sodium-based montmorillonite aqueous dispersion solution were uniformly mixed with a rotation speed of 150 r/min at 65° C. to obtain a mixed solution A; 10 g of 0.5% N,N'-methylenebisacrylamide solution was added into 10 g of the acrylic acid solution with a neutralization degree of 60% to form a mixed solution B, the mixed solution B was dripped into the mixed solution A at a rate of 5 drops/s, and 10 g of 1.0% ammonium persulfate was dripped into the mixed solution A at a rate of 4 drops/s; after the solution was dripped, mechanical stirring was continued for 40 min, the temperature was risen to 70° C., and the stirring was continued for 4 h to obtain a viscous gel material; the gel material was frozen at −4° C. for 12 h, then thawed at room temperature for 10 h, frozen and thawed 5 times under the same conditions and operations, and then the gel material was put in a freeze dryer to freeze-dry to obtain the humic acid type adsorption material.

Embodiment 4

10 g of 0.5% carboxymethyl cellulose solution, 10 g of 0.8% sodium humate solution and 6 g of 0.5% sodium-based montmorillonite aqueous dispersion solution were uniformly mixed with a rotation speed of 100 r/min at 65° C. to obtain a mixed solution A; 10 g of 0.2% N,N'-methylenebisacrylamide solution was added into 10 g of the acrylic acid solution with a neutralization degree of 20% to form a mixed solution B, the mixed solution B was dripped into the mixed solution A at a rate of 5 drops/s, and 10 g of 1.0% ammonium persulfate was dripped into the mixed solution A at a rate of 4 drops/s; after the solution was dripped, mechanical stirring was continued for 20 min, the temperature was risen to 70° C., and the stirring was continued for 4 h to obtain a viscous gel material; the gel material was frozen at −4° C. for 12 h, then thawed at room temperature for 6 h, frozen and thawed 3 times under the same conditions and operations, and then the gel material was put in a freeze dryer to freeze-dry to obtain the humic acid type adsorption material.

Embodiment 5

15 g of 0.6% carboxymethyl cellulose solution, 10 g of 1.0% sodium humate solution and 8 g of 0.8% calcium-based montmorillonite aqueous dispersion solution were uniformly mixed with a rotation speed of 125 r/min at 60° C. to obtain a mixed solution A; 10 g of 0.3% N,N'-methylenebisacrylamide solution was added into 10 g of the acrylic acid solution with a neutralization degree of 40% to form a mixed solution B, the mixed solution B was dripped into the mixed solution A at a rate of 4 drops/s, and 10 g of 0.7% ammonium persulfate was dripped into the mixed solution A at a rate of 3 drops/s; after the solution was dripped, mechanical stirring was continued for 30 min, the temperature was risen to 70° C., and the stirring was continued for 3 h to obtain a viscous gel material; the gel material was frozen at −4° C. for 12 h, then thawed at room temperature for 10 h, frozen and thawed 4 times under the same conditions and operations, and then the gel material was put in a freeze dryer to freeze-dry to obtain the humic acid type adsorption material.

Embodiment 6

20 g of 0.7% carboxymethyl cellulose solution, 10 g of 1.5% sodium humate solution and 10 g of 1.5% sodium-based montmorillonite aqueous dispersion solution were uniformly mixed with a rotation speed of 150 r/min at 65° C. to obtain a mixed solution A; 10 g of 0.5% N,N'-methylenebisacrylamide solution was added into 10 g of the acrylic acid solution with a neutralization degree of 60% to form a mixed solution B, the mixed solution B was dripped into the mixed solution A at a rate of 3 drops/s, and 10 g of 1.0% ammonium persulfate was dripped into the mixed solution A at a rate of 2 drops/s; after the solution was dripped, mechanical stirring was continued for 40 min, the temperature was risen to 70° C., and the stirring was continued for 4 h to obtain a viscous gel material; the gel material was frozen at −4° C. for 12 h, then thawed at room temperature for 6 h, frozen and thawed 5 times under the same conditions and operations, and then the gel material was put in a freeze dryer to freeze-dry to obtain the humic acid type adsorption material.

Embodiment 7

15 g of 0.6% carboxymethyl cellulose solution, 10 g of 0.8% potassium humate solution and 8 g of 1.0% sodium-based montmorillonite aqueous dispersion solution were uniformly mixed with a rotation speed of 125 r/min at 60° C. to obtain a mixed solution A; 10 g of 0.35% N,N'-methylenebisacrylamide solution was added into 10 g of the acrylic acid solution with a neutralization degree of 40% to form a mixed solution B, the mixed solution B was dripped into the mixed solution A at a rate of 4 drops/s, and 10 g of 0.7% ammonium persulfate was dripped into the mixed solution A at a rate of 3 drops/s; after the solution was dripped, mechanical stirring was continued for 30 min, the temperature was risen to 70° C., and the stirring was continued for 3 h to obtain a viscous gel material; the gel material was frozen at −4° C. for 12 h, then thawed at room temperature for 10 h, frozen and thawed 3 times under the same conditions and operations, and then the gel material was put in a freeze dryer to freeze-dry to obtain the humic acid type adsorption material.

(1) Adsorption Material for Methylene Blue Dye

The dried efficient, selectable and degradable humic acid type adsorption material was taken to study the adsorption on methylene blue dye (MB). Determination of methylene blue dye concentration: an ultraviolet spectrophotometer was used to determine its concentration at a wavelength of 664 nm.

Absorption Capacity was Calculated:

$$Q_t = \frac{C_0 - C_t}{m} V \quad (1)$$

$$Q_e = \frac{C_0 - C_e}{m} V \quad (2)$$

where, $Q_t$ and $Q_e$ were the adsorption capacity at a moment t and the adsorption capacity at an equilibrium moment, $C_e$ and $C_0$ represented the equilibrium and initial concentration, respectively, V was the volume of the organic dyes, and m was the mass of the adsorption material.

The effects of the amount of adsorption material, initial pH of the solution, adsorption temperature, equilibrium concentration, and reaction time on the adsorption process were studied. At the same time, the adsorption kinetics, isotherms and thermodynamics were fitted.

Figure 2A:
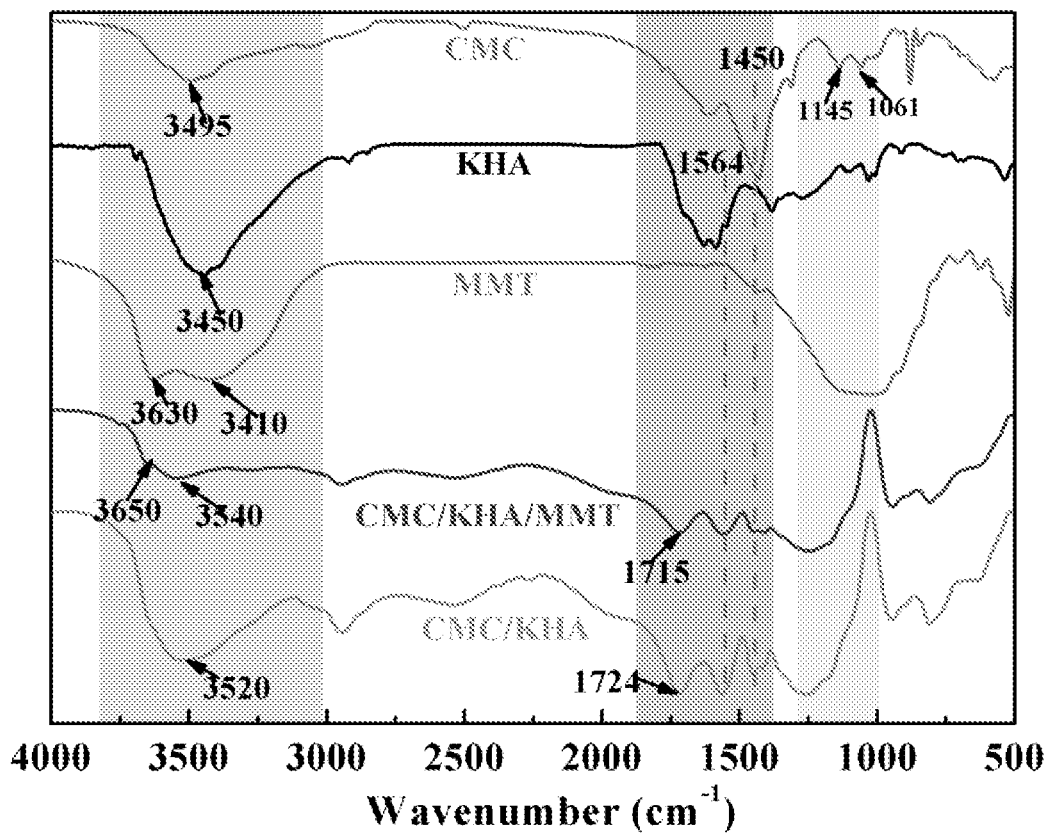
FIG. 2a is an infrared test chart of the synthetic raw materials and the prepared adsorption material.
Figure 2B:
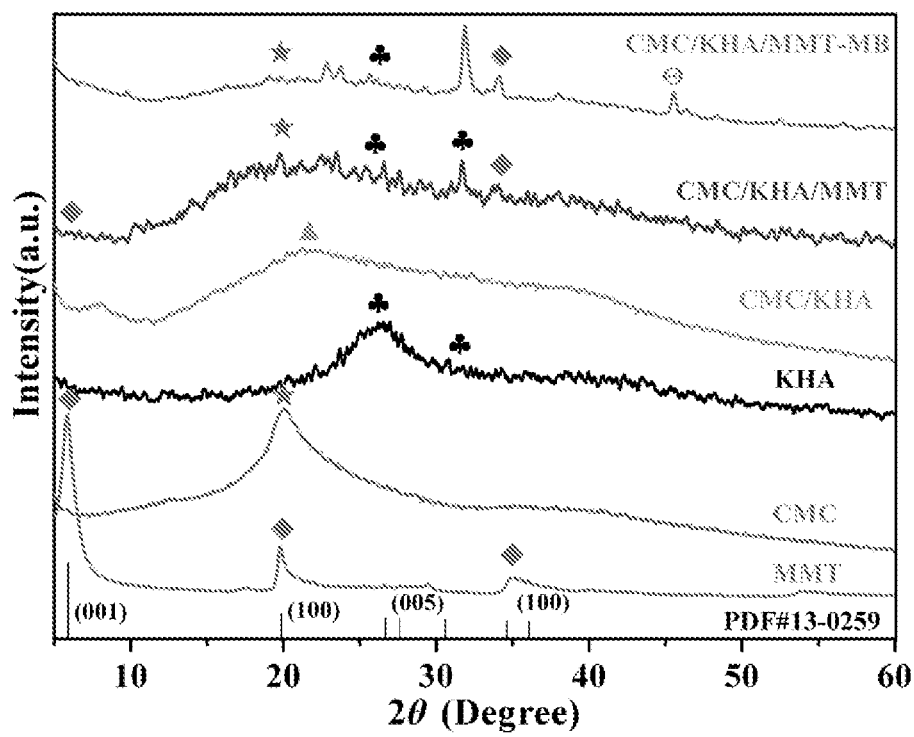
FIG. 2b is an XRD pattern of the synthetic raw materials and the prepared adsorption material before and after the methylene blue dye is adsorbed.
Figure 2C:
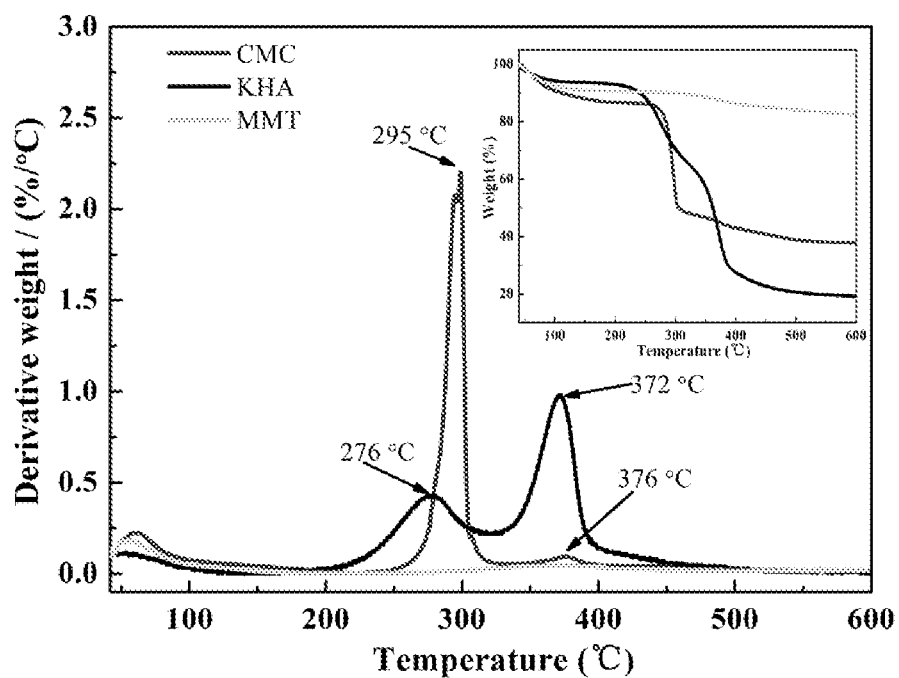
FIG. 2c is a TGA chart of the synthetic raw materials before and after the methylene blue dye is adsorbed.
Figure 2D:
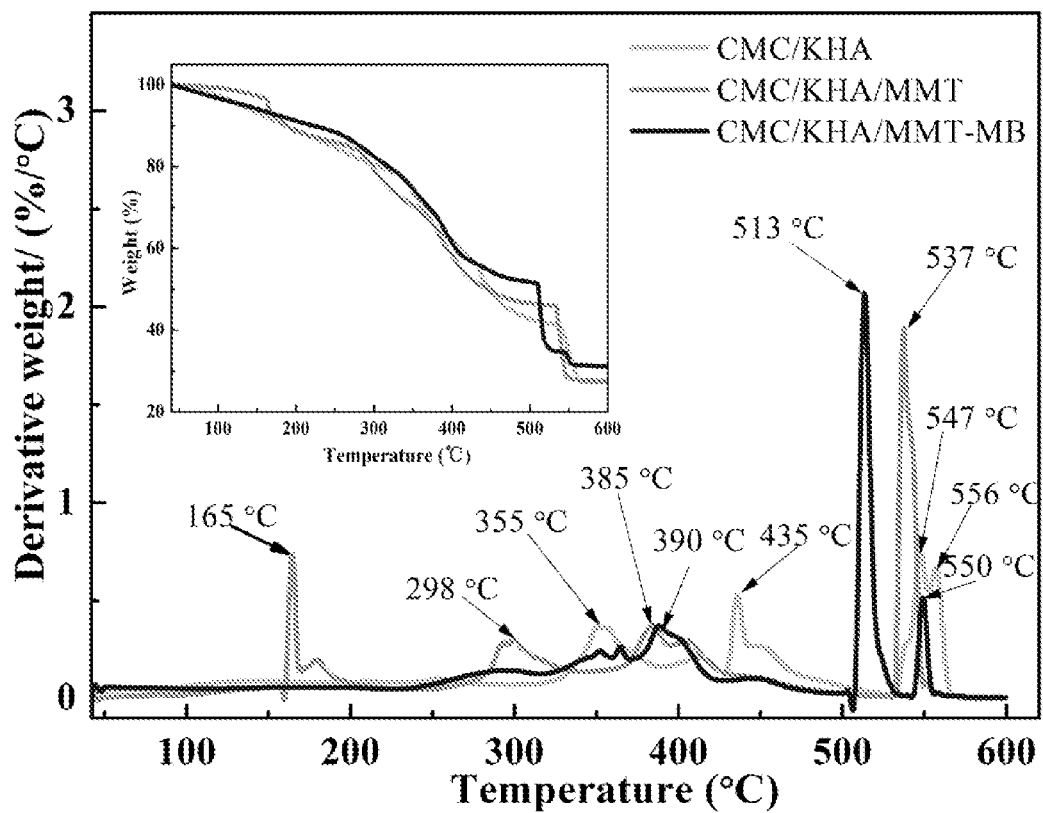
FIG. 2d is a TGA chart of the adsorption material prepared in Embodiment 7 before and after the methylene blue dye is adsorbed.
Figure 2E:
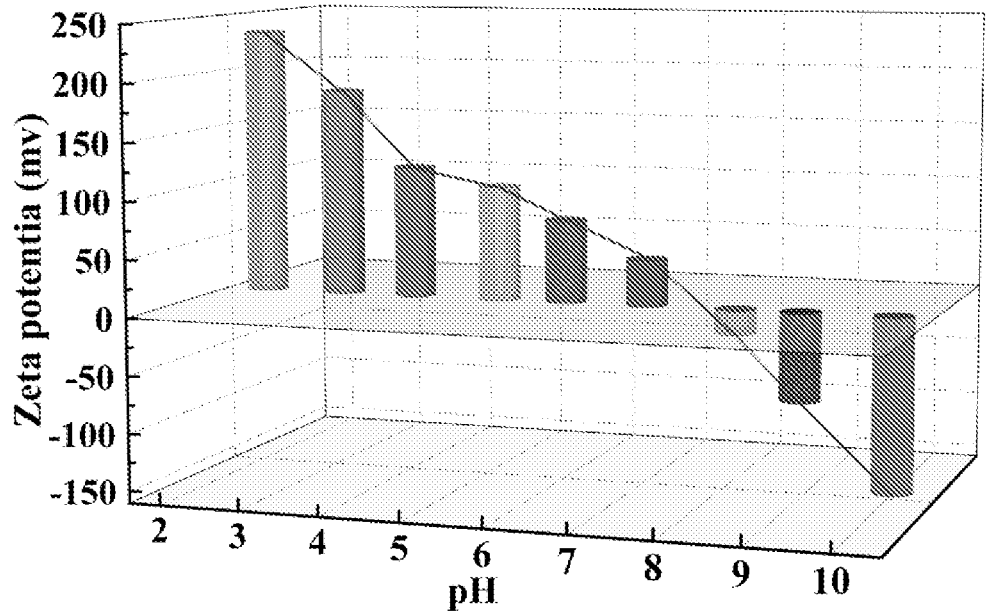
FIG. 2e is a Zeta chart of the prepared adsorption material.

FIG. 2a was the FT-IR diagram of the synthetic raw materials and the adsorption materials. From the displacement value changes of the main absorption peaks in the figure, it could be concluded that the main functional groups between the raw materials had been combined, and the humic acid type adsorption material had been successfully synthesized. FIG. 2b showed the XRD pattern of synthetic raw materials and the adsorption materials after MB was adsorbed. From FIG. 2b, according to the changes in the x-ray diffraction peak diffraction angles of the synthetic raw materials and the adsorption material, it could be seen that the humic acid type adsorption material had been successfully prepared; from FIG. 2b, according to the changes in the x-ray diffraction peak diffraction angle of the adsorption material after MB was adsorbed, it could be concluded that MB had been successfully adsorbed by the humic acid type adsorption material. FIG. 2c was TGA charts of synthetic raw materials and the adsorption material after MB was adsorbed. According to the changes in the thermal stability of the synthetic raw materials and the adsorption material in FIG. 2c, it could be seen that the humic acid type adsorption material had been successfully synthesized, and the synthesized type adsorption material has higher thermal stability. According to the changes in the thermal stability of the adsorption material synthesized in FIG. 2c after M was adsorbed, it could be concluded that the humic acid adsorption material successfully adsorbed MB. FIG. 2d was a Zeta potential chart of the adsorption material, and from the figure, the Zeta potential value of the adsorption material was about 7.6. When the pH value was less than 7.6, the positive charge on the surface of the adsorption material was not conducive to the further adsorption of positive MB. When the pH value was greater than 7.6, the negative charge on the surface of the adsorption material was conducive to adsorption of positively charged MB.

Figure 3:
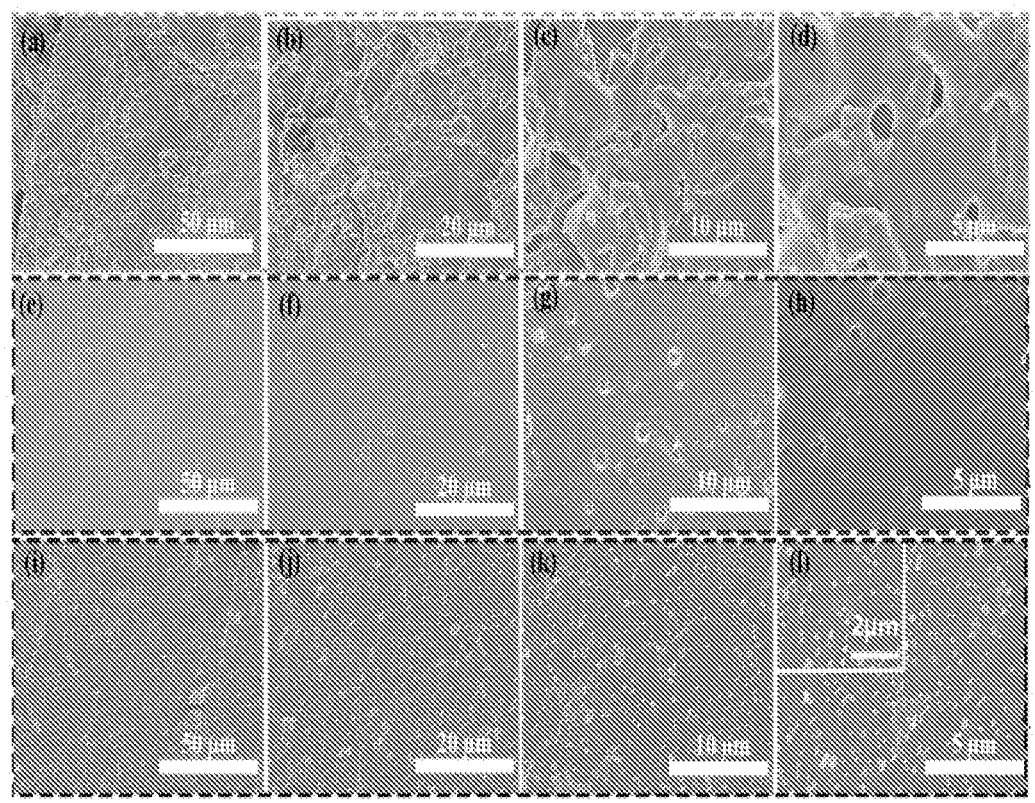
FIG. 3 is SEM morphology analysis of a comparative sample of the adsorption material prepared in Embodiment 7 and the prepared adsorption material as well as after methylene blue dye is adsorbed, a-d is the adsorption material without montmorillonite; e-h is the prepared adsorption material; i-l is the SEM image of the adoption material after methylene blue is adsorbed.
Figure 3A:
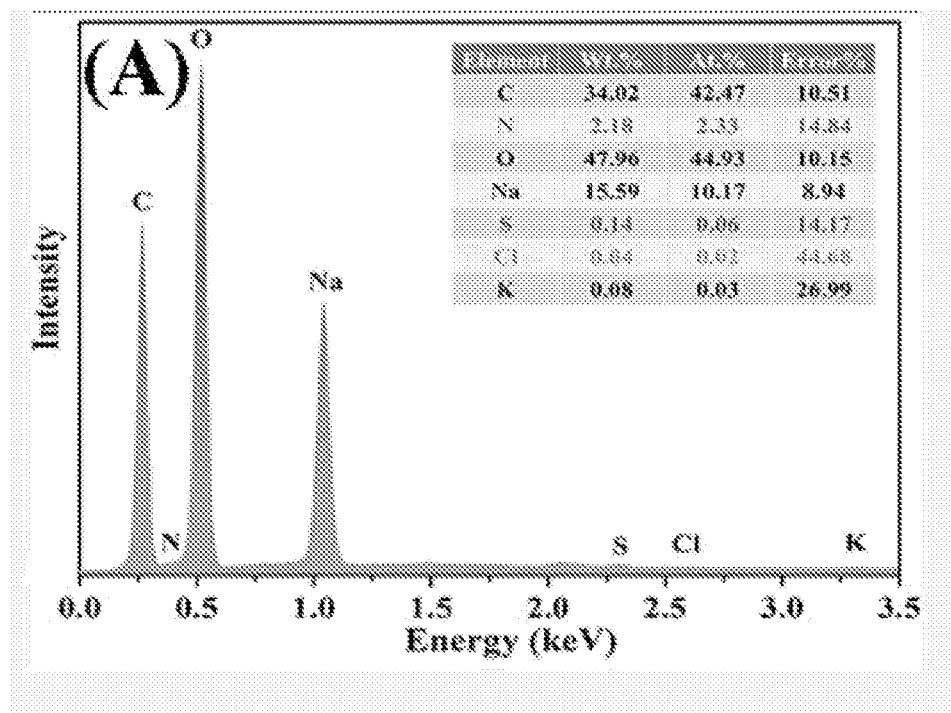
FIG. 3A is an EDS analysis chart of the adsorption material without montmorillonite.
Figure 3B:
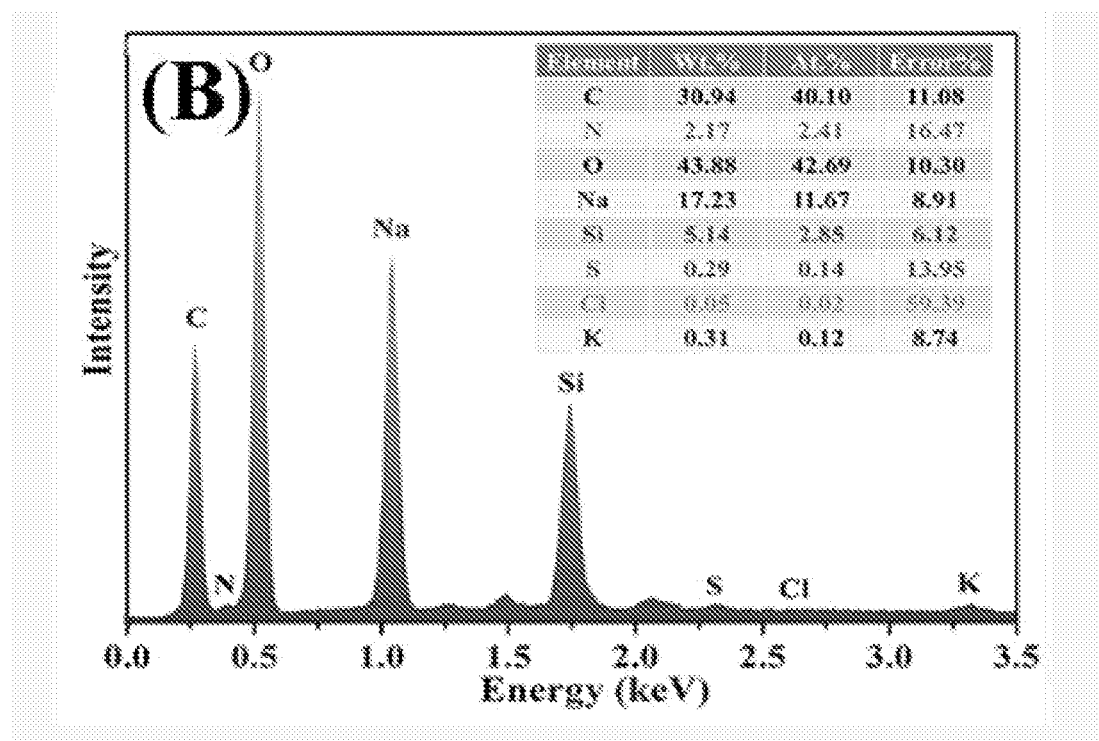
FIG. 3B is an EDS analysis chart of the adsorption material before methylene blue is adsorbed.
Figure 3C:
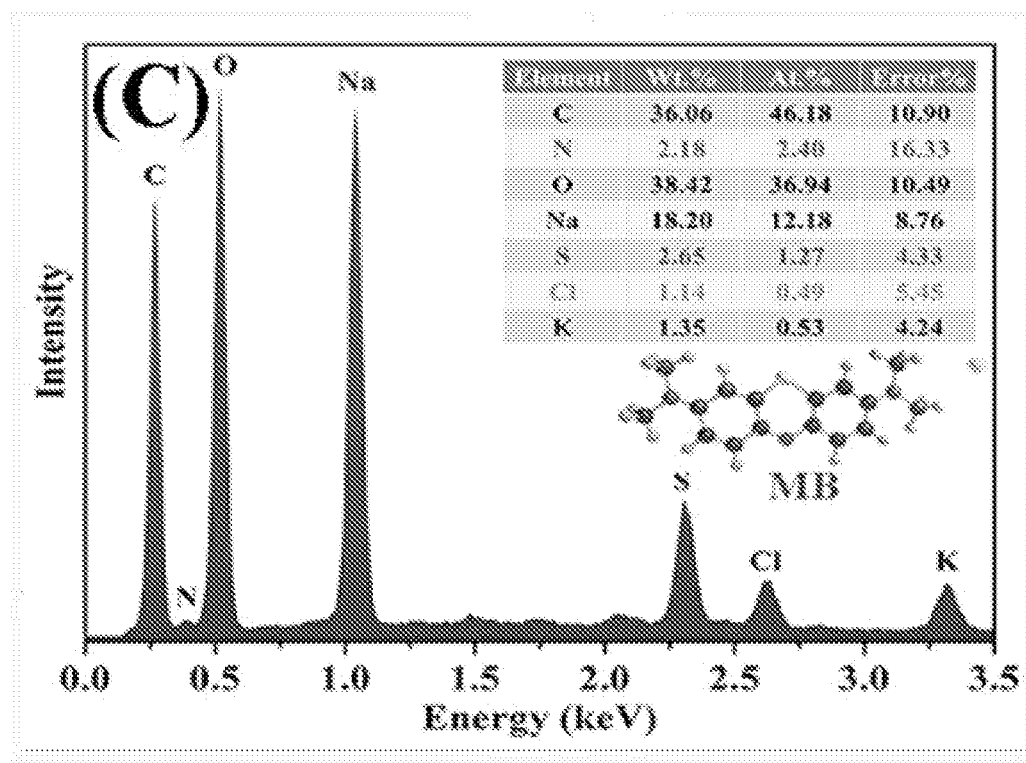
FIG. 3C is an EDS analysis chart of the adsorption material after methylene blue is adsorbed.

FIG. 3 showed the SEM microscopic morphology of the humic acid type adsorption material without montmorillonite and the added humic type adsorption material after MB was adsorbed. a-d were the microscopic morphology of the humic acid type adsorption material without montmorillonite, and it could be clearly observed from the figure that the surface of the adsorption material had a small pore size and a relatively smooth surface, which was not conducive to the adsorption of MB. e-h were respectively the microscopic morphology of the humic type adsorption material with montmorillonite, and it could be observed from the figure that the adsorption material had a larger surface pore size, a rougher surface, and more wrinkles, which was conducive to the adsorption of MB. I-h were the microscopic morphology of the humic acid type adsorption material with montmorillonite after MB was adsorbed and it could be observed from the figure that the surface of the adsorbent material was covered by many particles, and the particulate matters ware more uniformly dispersed; by combining the changes of element content in EDS charts of FIG. 3A, FIG. 3B and FIG. 3C adsorption materials before and after the MB was adsorbed, it could be concluded that after the humic acid type adsorption material with montmorillonite adsorbed MB, the content of N, S, and Cl elements in the material increased significantly, the MB was adsorbed successfully by the adsorption material, and at the same time, the humic acid type adsorption material had a significant adsorption effect on MB.

Figure 4A:
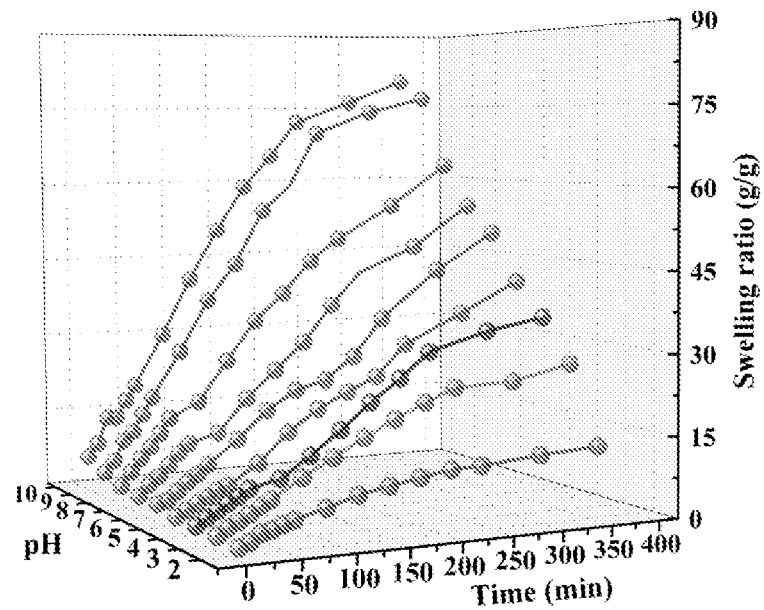
FIG. 4a is a diagram showing the swelling change of the adsorption material in different pH aqueous solutions at different time.
Figure 4B:
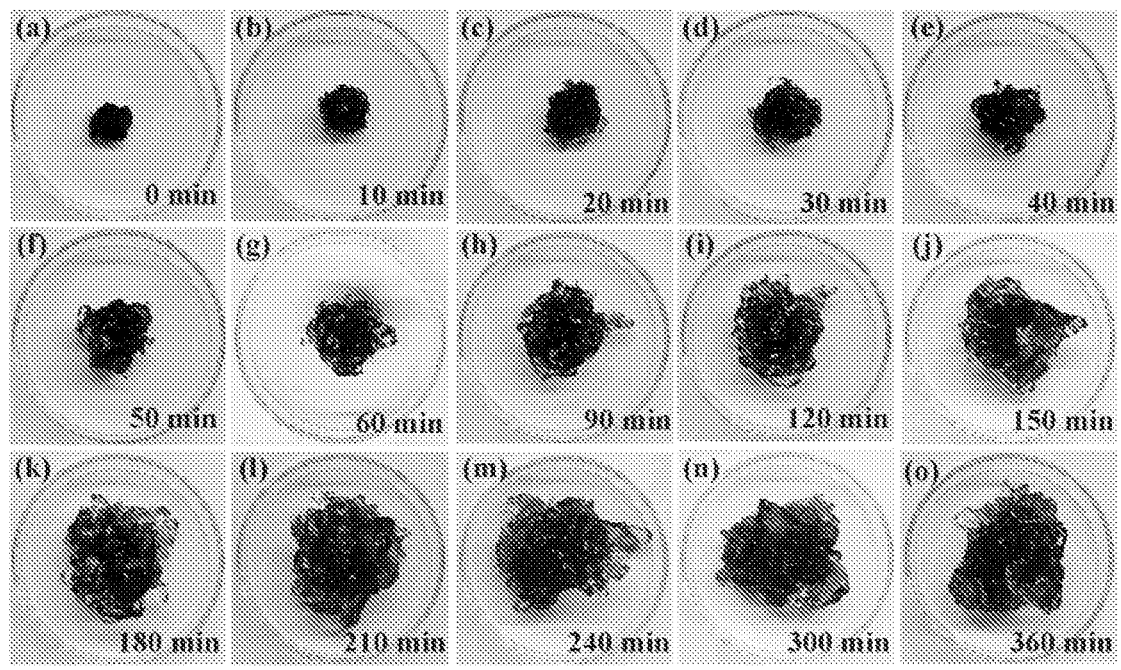
FIG. 4b is an optical photo showing the swelling change of the adsorption material at different time at pH=8.

As shown in FIG. 4a, the swelling situation of the adsorption material in different pH aqueous solutions at different times. It could be observed from the figure that as the adsorption time increased, the adsorption material swelled gradually, and the increase rate was faster at the beginning. As time increased, the water swelling rate gradually slowed down. At the same time, as the pH value of the aqueous solution increased, the swelling of the adsorption material gradually increased. When the pH value was 8-10, the alkaline environment increased at a faster rate. FIG. 4b was a photo of the swelling condition of the adsorption material at different times when pH was 8.

Figure 5:
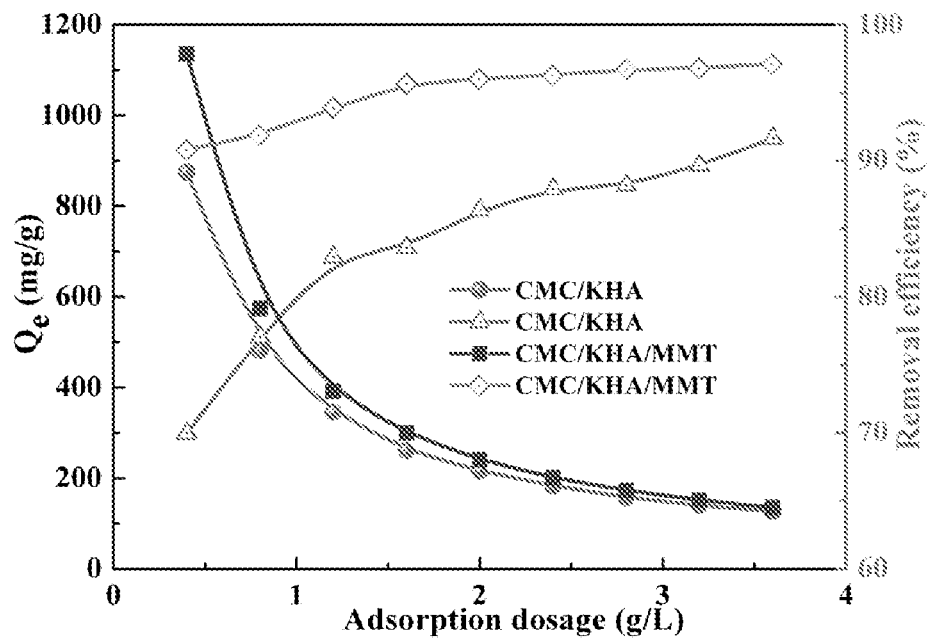
FIG. 5 is a data diagram showing the influence of the amount of the adsorption material t prepared in Embodiment 7 on the adsorption capacity and removal rate of the adsorption material to remove methylene blue.

As shown in FIG. 5, when the amount of adsorption material was 0.4-0.8 g/L, the adsorption capacity was relatively large, but the removal rate of methylene blue dye was low. When the amount of adsorption material was 1.6-3.6 g/L, the removal rate was relatively high, but the adsorption capacity for methylene blue dye was low. Considering the two factors of adsorption capacity and removal rate, the final dosage of 1.2 g/L adsorption material was selected as the final usage dosage.

Figure 6:
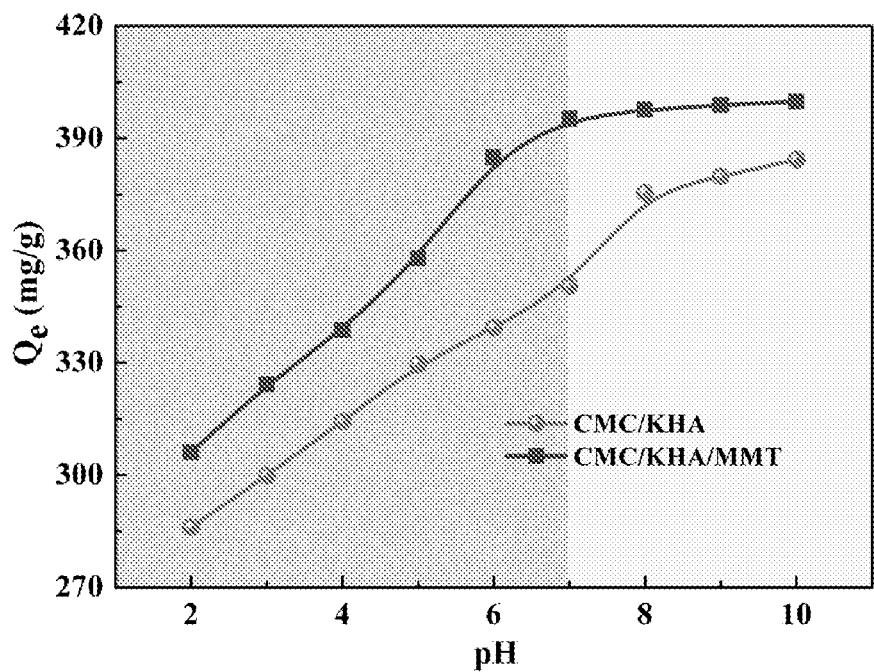
FIG. 6 shows the effect of the initial pH of the solution on the adsorption capacity of the adsorption material prepared in Embodiment 7 to remove methylene blue.

As shown in FIG. 6, when the pH value was low, the adsorption effect was relatively low. When the pH value was greater than 2 and smaller than 6, the adsorption effect increased rapidly. When the pH value reached 8, the adsorption effect was the best and the adsorption capacity increased slowly, and was basically kept constant.

Figure 7A:
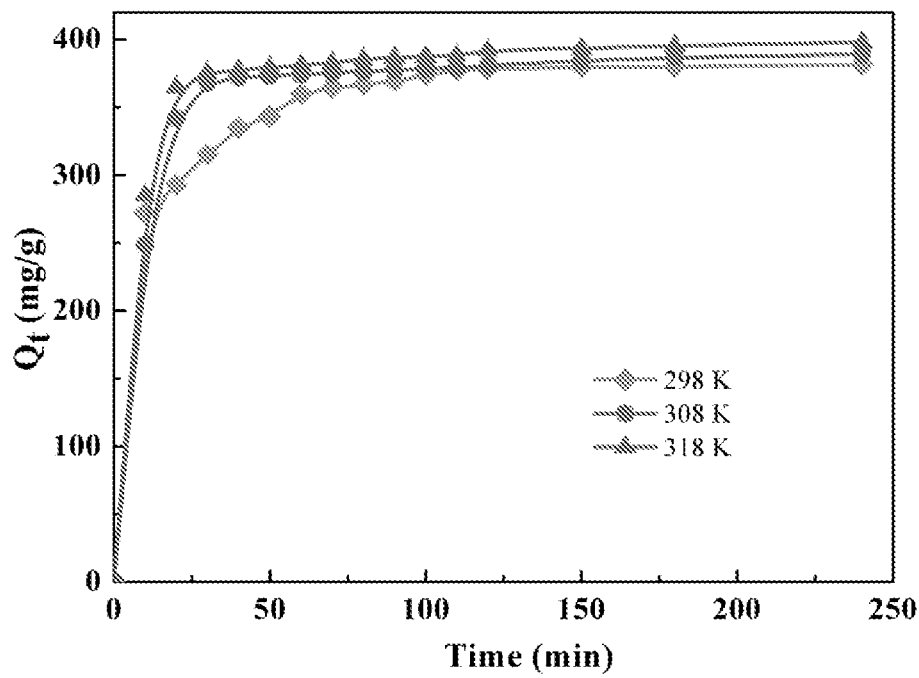
FIG. 7a is a graph showing the influence of adsorption time on adsorption capacity at different temperatures.
Figure 7B:
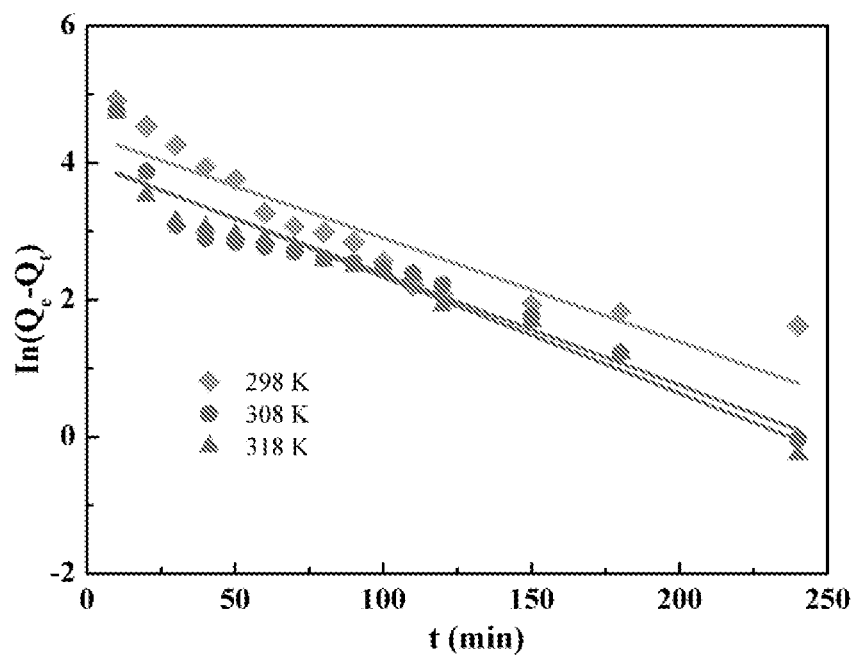
FIG. 7b and FIG. 7c are the quasi-first-order and quasi-second-order kinetic models of methylene blue adsorption.
Figure 7C:
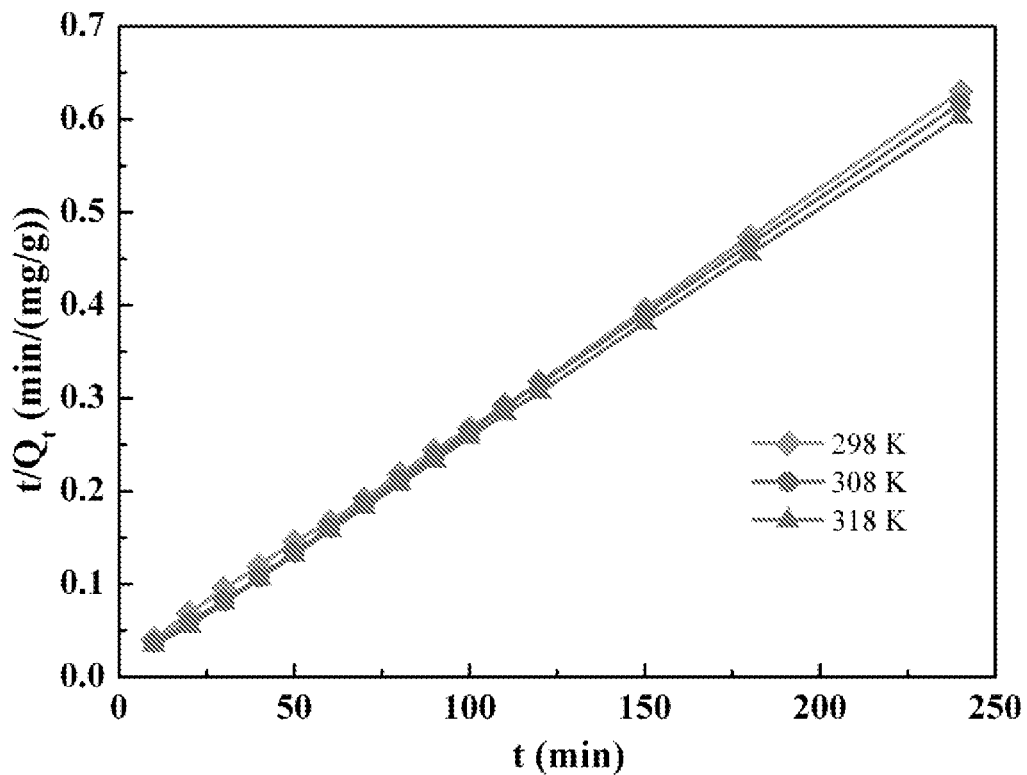

The effect of adsorption time and temperature was shown in FIG. 7a. The adsorption capacity first increased rapidly with time, and then increased slowly. In FIG. 7a, as the adsorption temperature rose, the adsorption of methylene blue by the humic acid type adsorption material increased rapidly within 60 min, and then increased slowly, basically reaching adsorption equilibrium within 60 min. FIG. 7b and FIG. 7c were the quasi-first- and quasi-second-order kinetic models for the adsorption of methylene blue by the humic acid type adsorption material, respectively. According to the experimental data fitting results, the adsorption of the humic acid type adsorption material on methylene blue was more in line with the quasi-second-order dynamic model.

Figure 8:
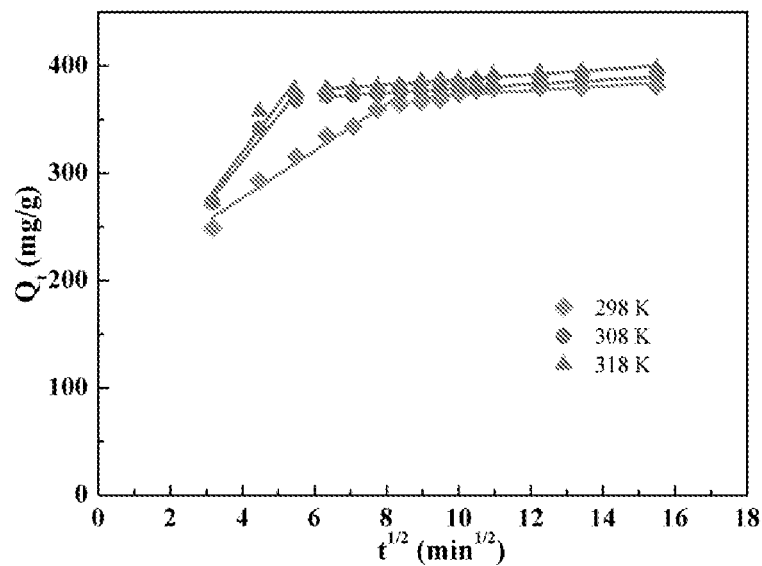
FIG. 8 is a kinetic curve of the adsorption of methylene blue by the adsorption material prepared in Embodiment 7 (an internal diffusion kinetic model for the adsorption of methylene blue).

FIG. 8 showed the internal diffusion kinetics model of the adsorption of methylene blue by the humic acid type adsorption material. According to the experimental data fitting results, the adsorption process of the humic acid type adsorption material for methylene blue was more complicated and was not a single adsorption process.

Figure 9A:
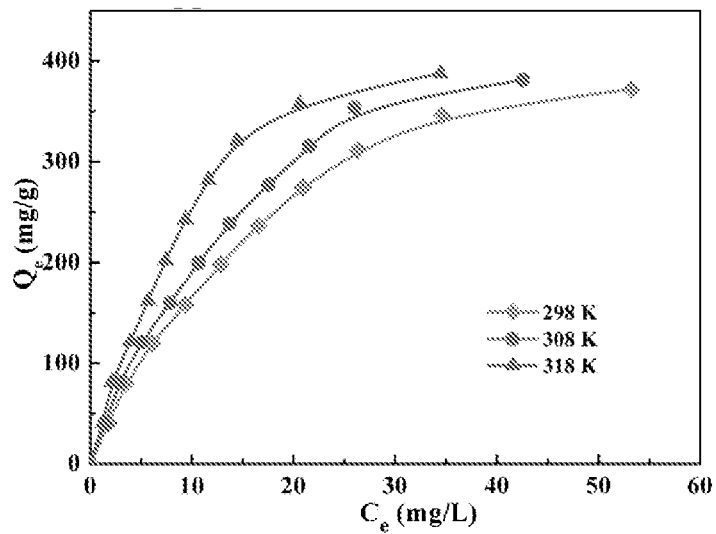
FIG. 9a is a graph showing the relationship between the initial concentration of methylene blue and the adsorption capacity of the adsorption material at different temperatures.
Figure 9B:
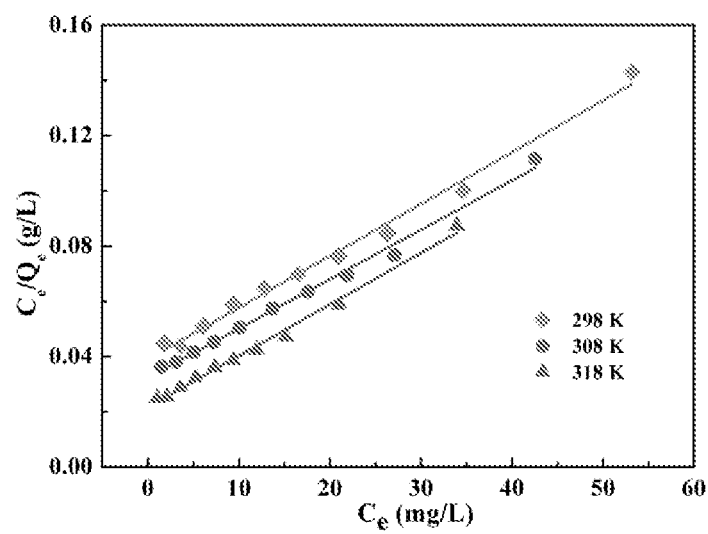
FIG. 9b and FIG. 9c are the Langmuir and Freundlich isothermal models for the adsorption of methylene blue, respectively.
Figure 9C:
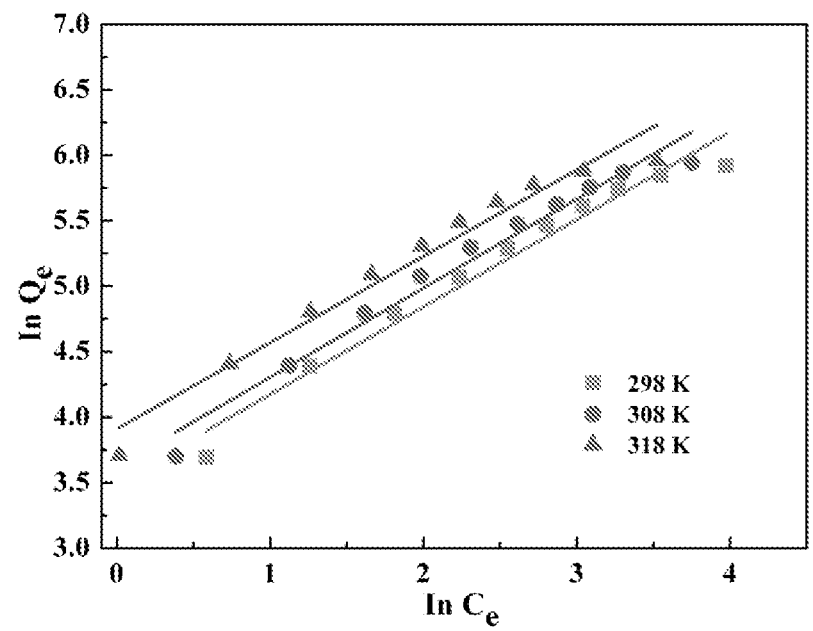

FIG. 9a showed the relationship between the initial concentration of different MB and the adsorption capacity. When the initial concentration of MB gradually increased, the adsorption capacity gradually increased. When the initial MB concentration reached a certain value, the adsorption capacity increased slowly. FIGS. 9b and 9c showed the Langmuir and Freundlich adsorption isotherm models of methylene blue adsorption by the humic acid type adsorption material, respectively. The fitting results of the experimental data showed that the adsorption of methylene blue by the humic acid type adsorption material conformed to the Langmuir adsorption isotherm. When the adsorption temperature was 25° C., the maximum adsorption capacity of methylene blue calculated by the Langmuir adsorption isotherm model was 534.76 mg/g.

Figure 10:
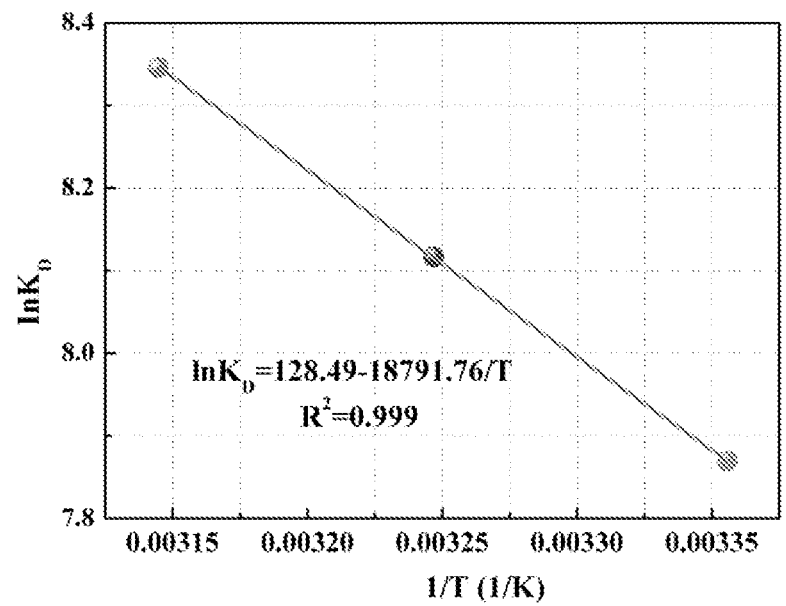
FIG. 10 is a thermodynamic curve of methylene blue adsorption by the adsorption material prepared in Embodiment 7.

FIG. 10 was a graph showing the fitting results of the adsorption thermodynamic data on the methylene blue by the humic acid type adsorption material. It could be seen from the figure that the adsorption enthalpy change (ΔH) of the humic acid type adsorption material for methylene blue adsorption was 18.79 kJ/mol, the entropy change (ΔS) was 128.49 J/mol·K, and the Gibbs free energy (ΔG) at 25° C. was −19.50 kJ/mol, indicating that the adsorption process of methylene blue by the humic acid type adsorption material was exothermic, entrop-increase and spontaneous reaction.

Figures 11, 12A:
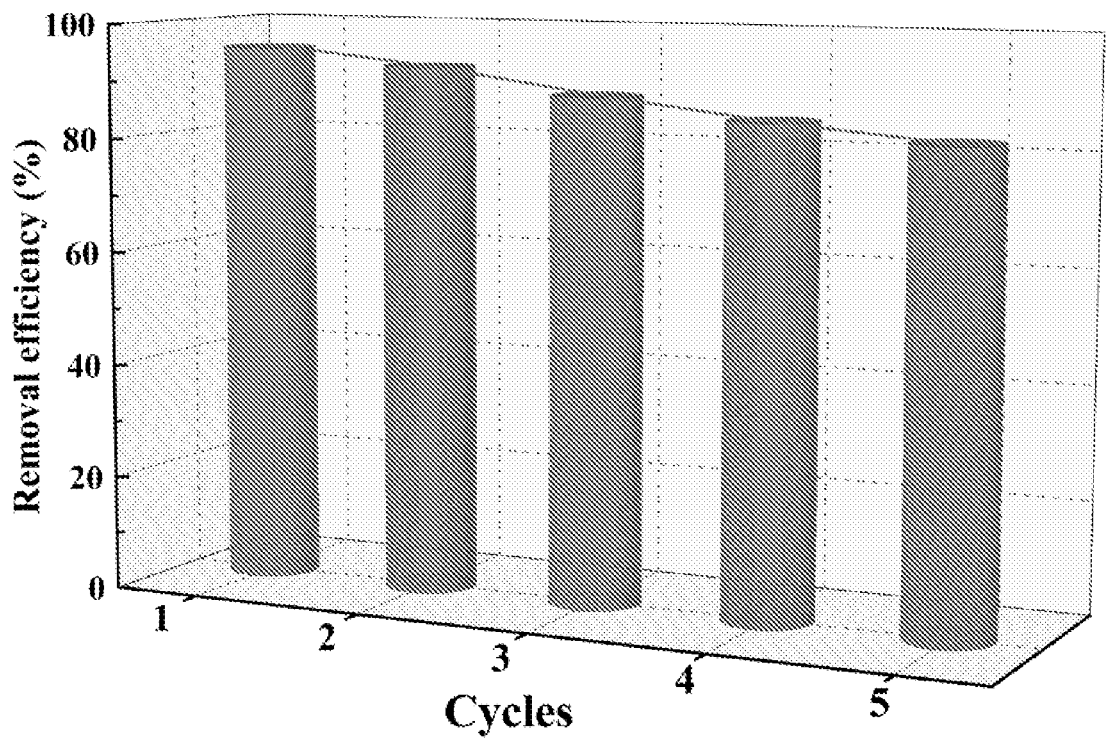
FIG. 11 is an analysis diagram of the recycling performance of the adsorption material prepared in Embodiment 7 (analysis diagram of the removal rate of the adsorption material for 5 cycles of methylene blue adsorption)
FIG. 12a shows absorption wavelength of methylene blue (MB) and rhodamine B(Rhb)
Figure 12B:
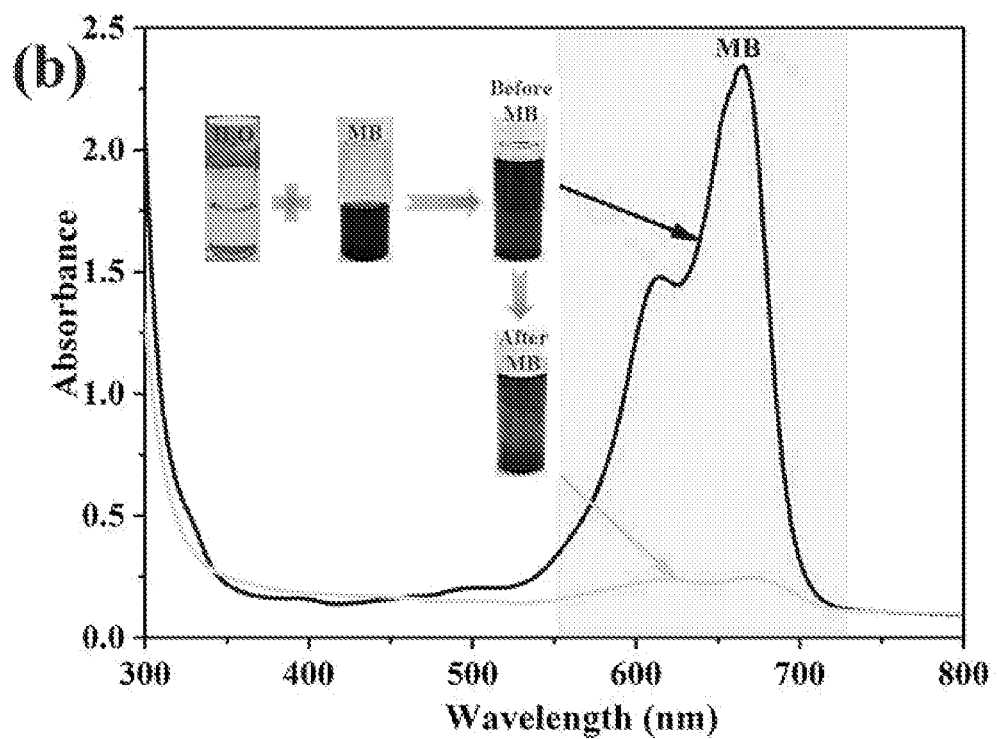
FIG. 12b is an absorption peak value diagram of MB by humic acid type adsorption material prepared in Embodiment 7.
Figure 12C:
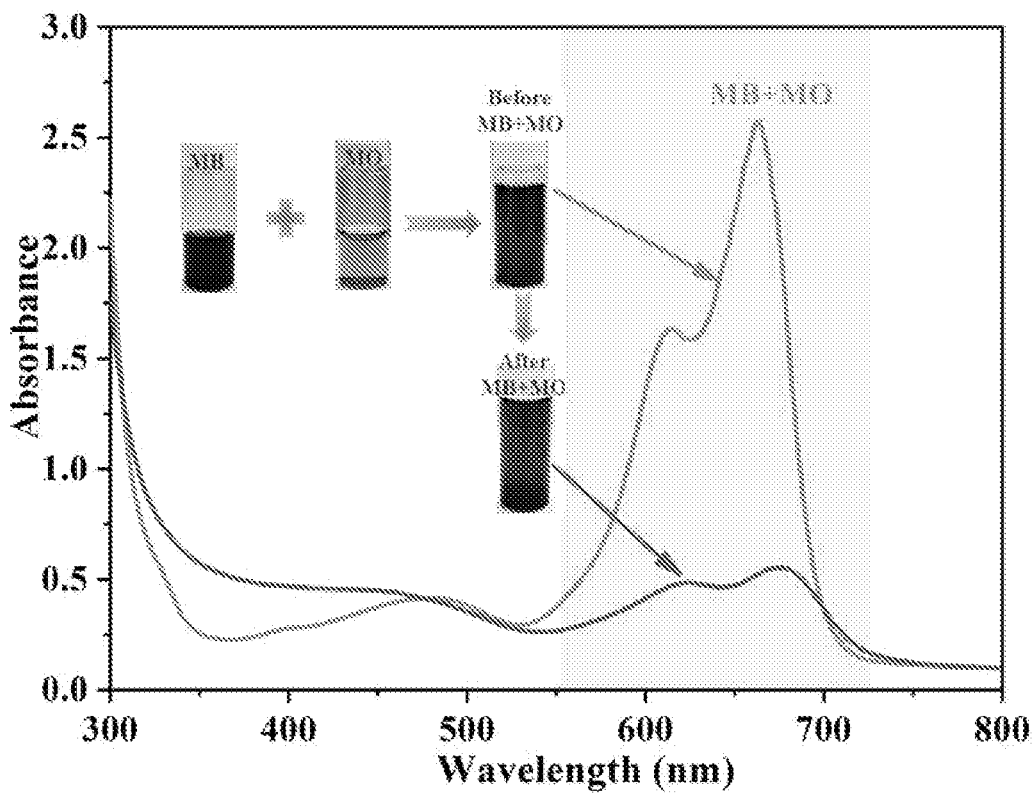
FIG. 12c is an absorption peak value diagram of MB and MO by humic acid type adsorption material prepared in Embodiment 7.
Figure 12D:
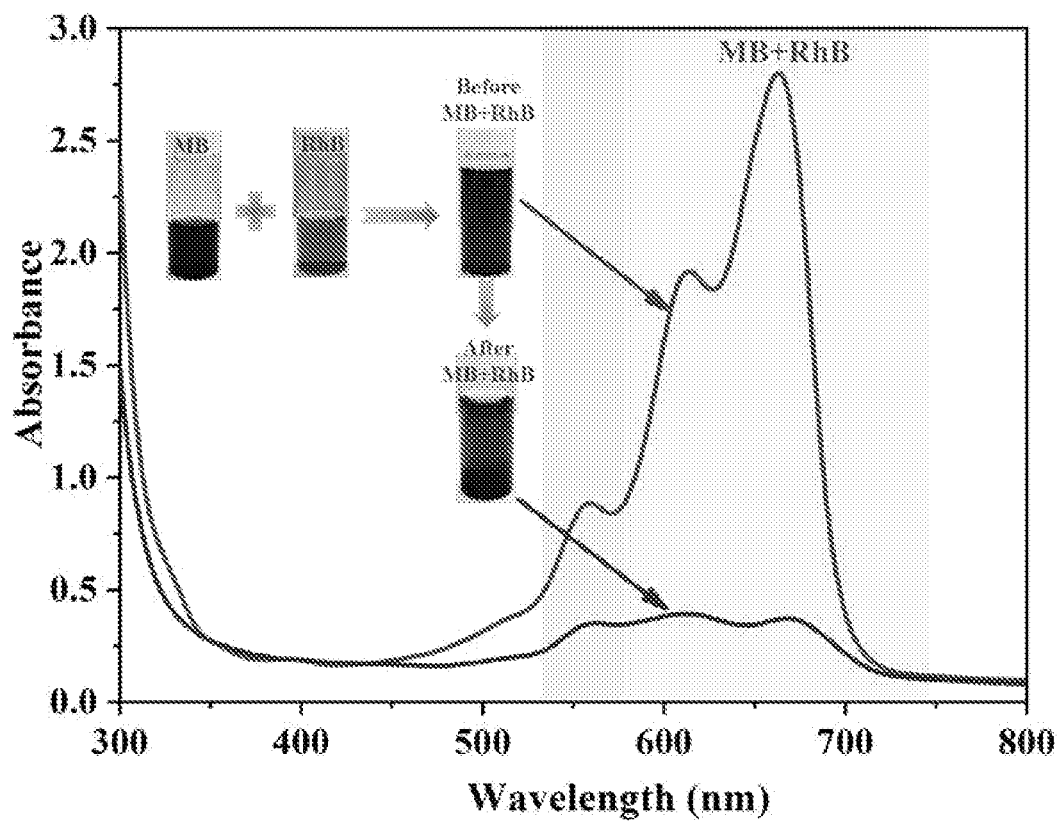
FIG. 12d is an absorption peak value diagram of MB and RhB by humic acid type adsorption material prepared in Embodiment 7

FIG. 12a-FIG. 12d were analysis charts of the test results of the specificity test of the humic acid type adsorption material to methylene blue, FIG. 12a showed that methylene blue (MB) and rhodamine B (RhB) were cationic dyes with maximum absorption wavelengths of 664 nm and 552 nm, respectively; methyl orange (MO) was an anionic dye with maximum absorption wavelength of 464 nm. In FIG. 12b, the strongest absorption peak before and after MB was adsorbed was significantly different, and the absorption peak after adsorption was significantly reduced, indicating that the humic acid type adsorption material had a higher adsorption capacity for cationic dye MB. In FIG. 12c, the absorption peak after MB was adsorbed was significantly reduced, and the absorption peak before and after MO was adsorbed was basically unchanged, indicating that the humic acid type adsorption material had higher removal capacity for MB, and poor adsorption and removal effect for the anionic dye methyl orange (MO). At the same time, it showed that in the presence of the anionic dye MO, the adsorption effect on the cationic dye MB was obvious. In FIG. 12d, the absorption peak after MB was adsorbed was significantly reduced, and the absorption peak before and after RhB was adsorbed changed little, indicating that the humic acid type adsorption material had higher removal capacity for MB and certain adsorption capacity for cationic dye RhB. At the same time, it showed that in the presence of cationic dye RhB, the adsorption effect of this adsorption material on cationic dye MB was obvious. By combining FIG. 12b, FIG. 12c and FIG. 12d, it could be concluded that the humic acid type adsorption material had higher adsorption capacity for cationic dye MB and better adsorption specificity.

Figure 13A:
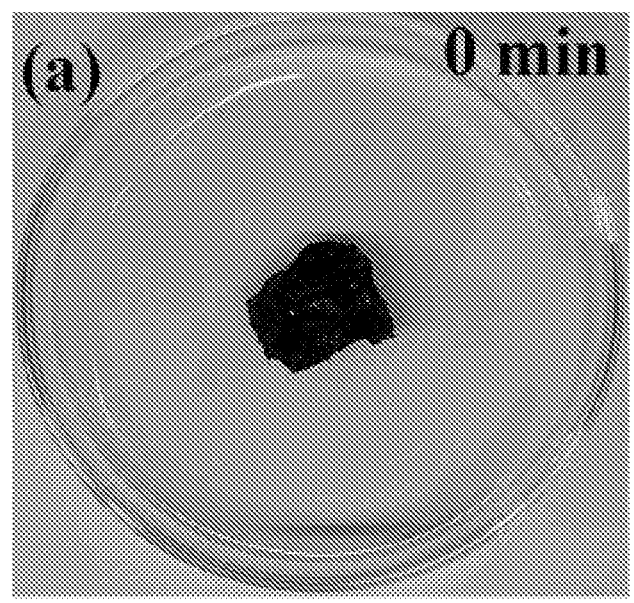
In FIG. 13a to FIG. 13o are optical photographs of the degradation of the adsorption material prepared in Embodiment 7 in an aqueous solution at 25° C. and pH=8.
Figure 13B:
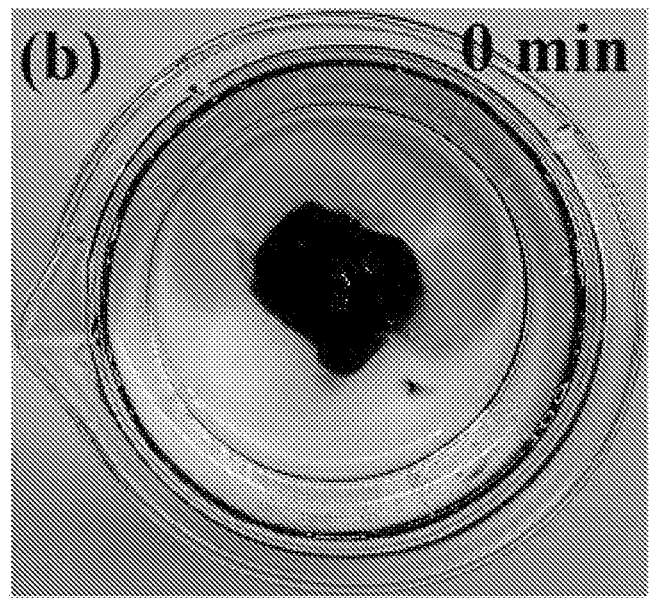
Figure 13C:
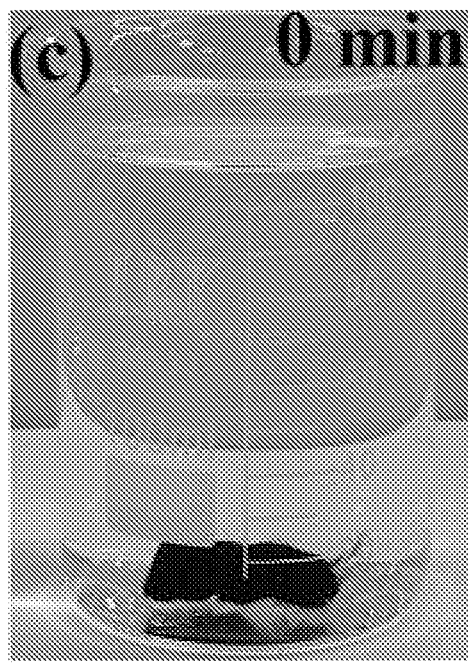
Figure 13D:
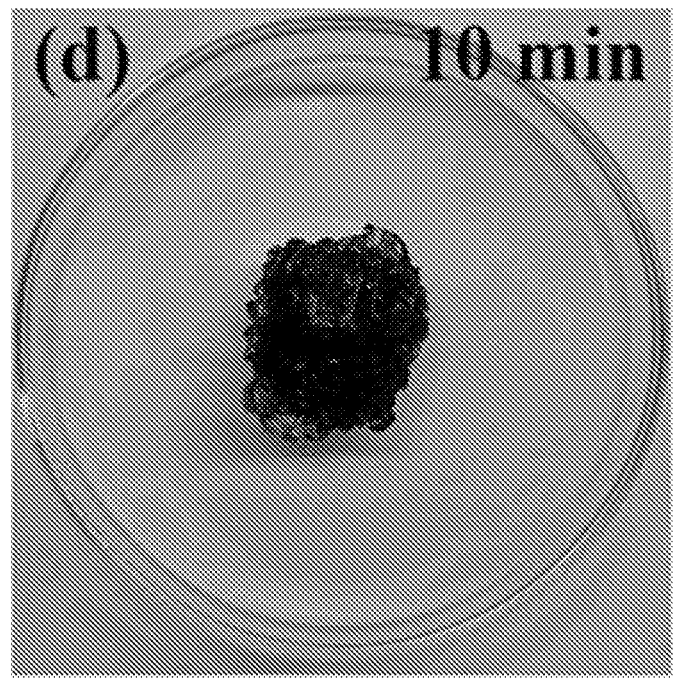
Figure 13E:
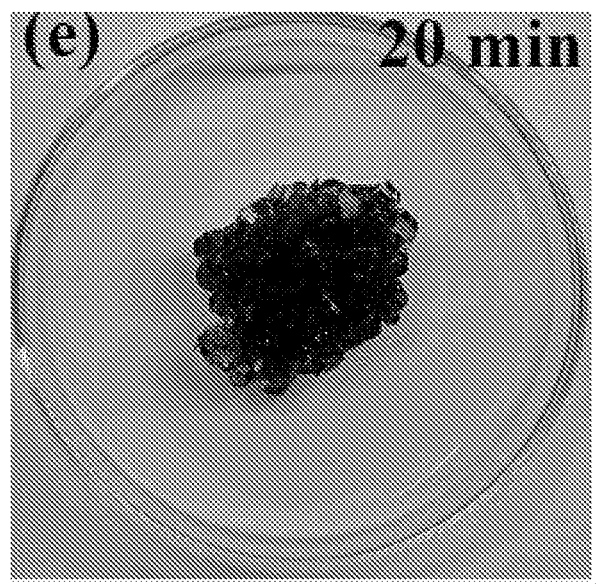
Figure 13F:
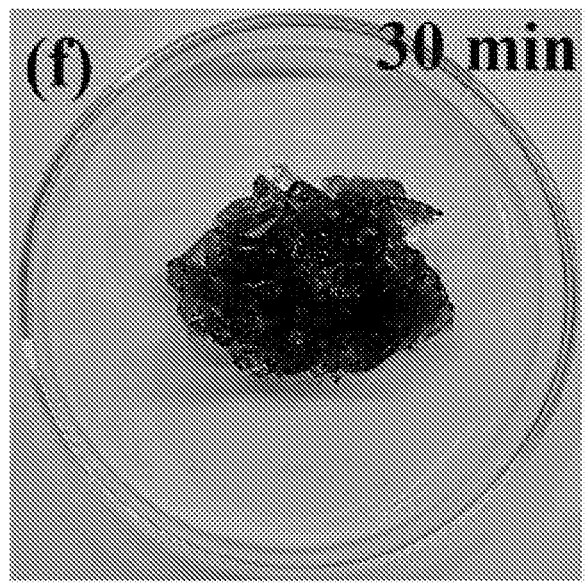
Figure 13G:
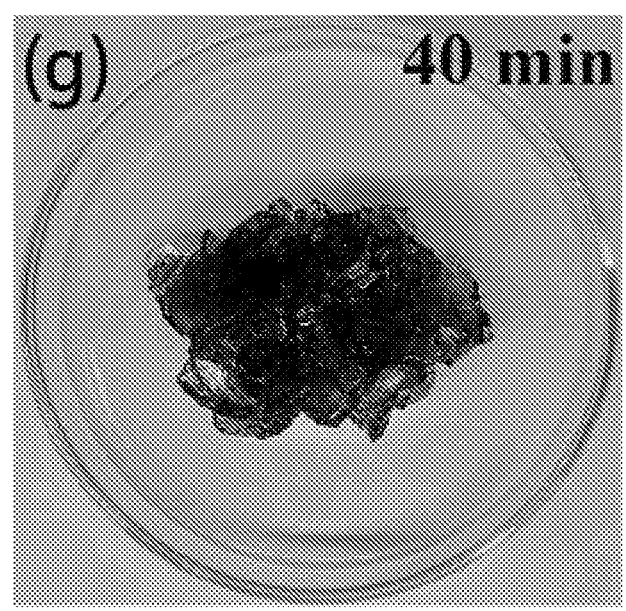
Figure 13H:
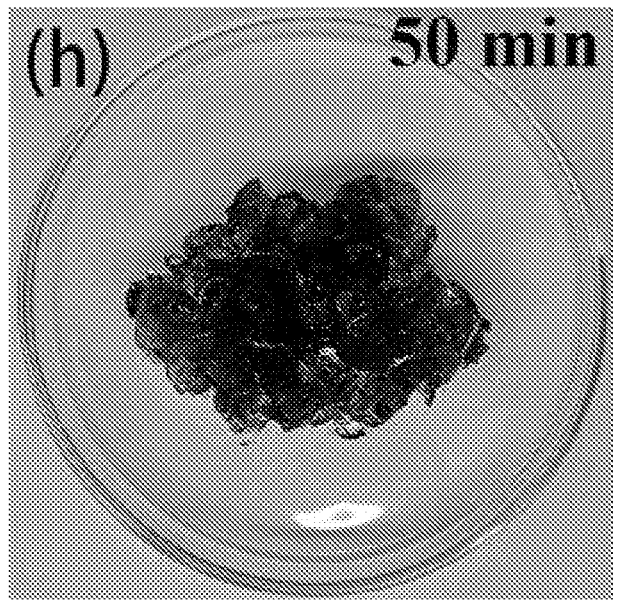
Figure 13I:
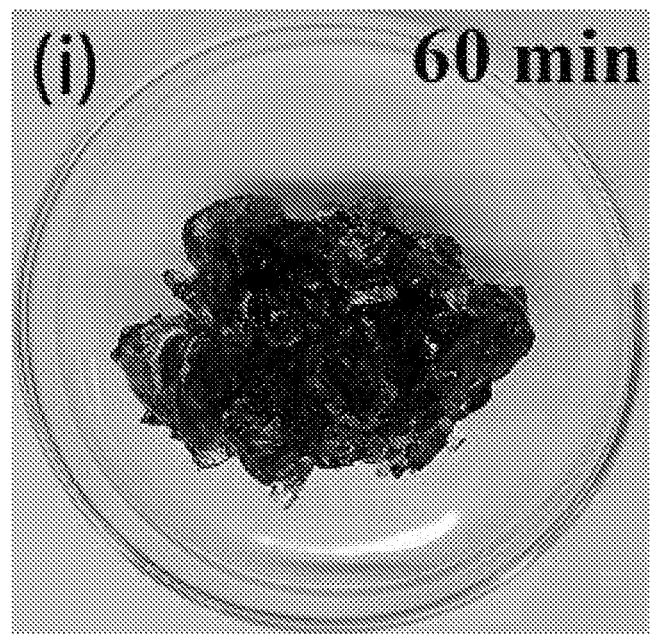
Figure 13J:
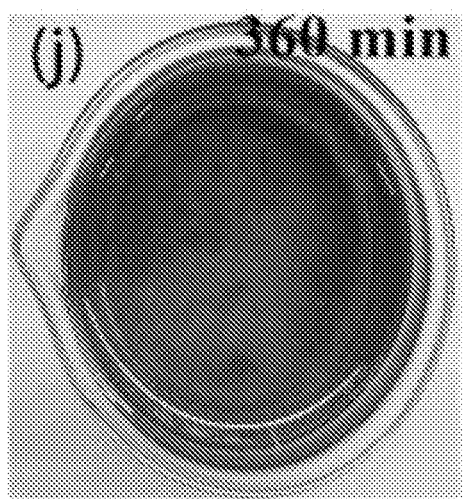
Figure 13K:
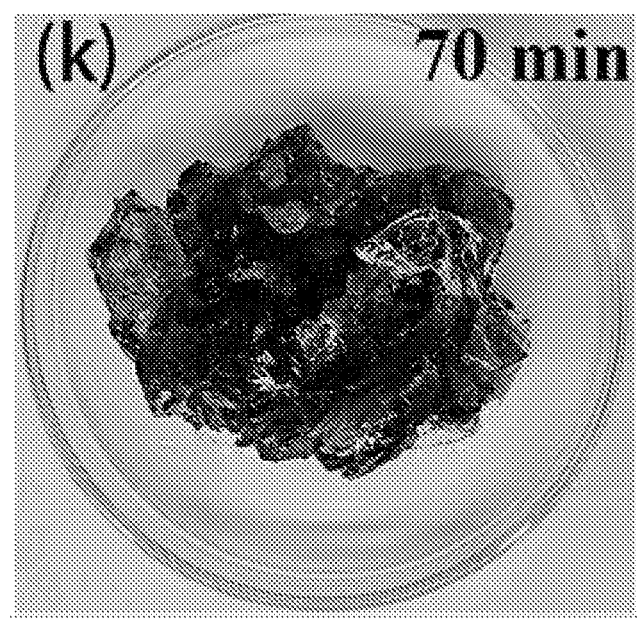
Figure 13L:
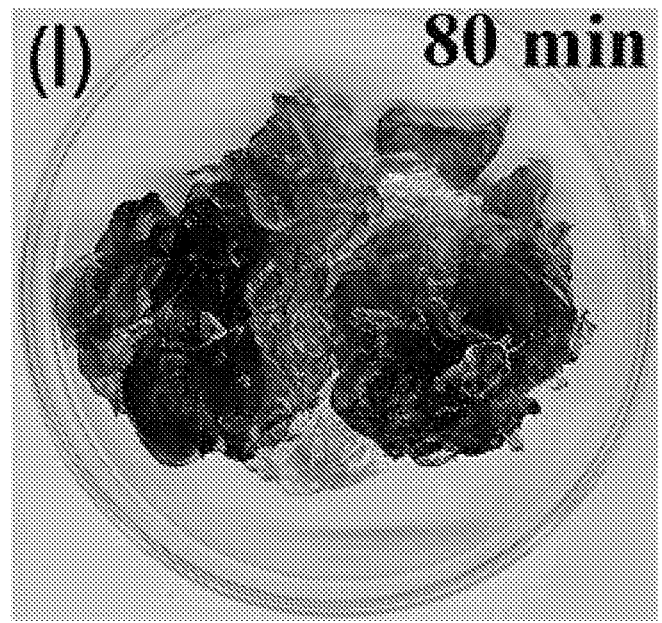
Figure 13M:
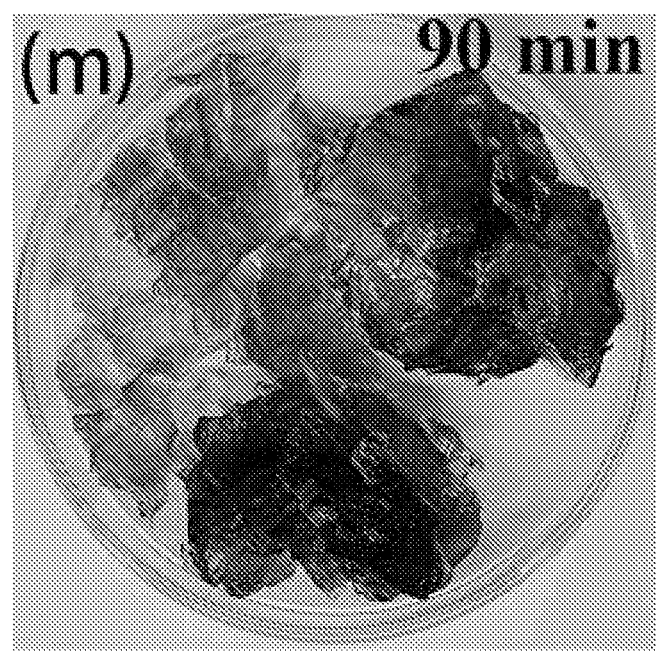
Figure 13N:
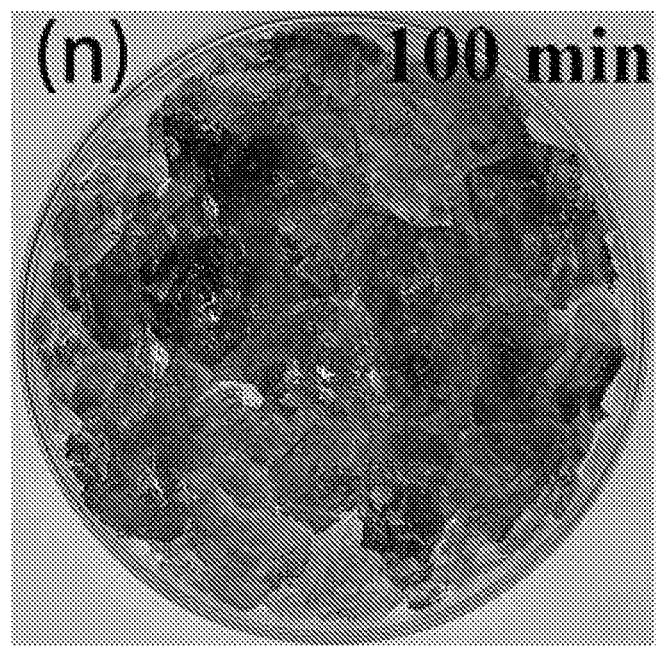
Figure 13O:
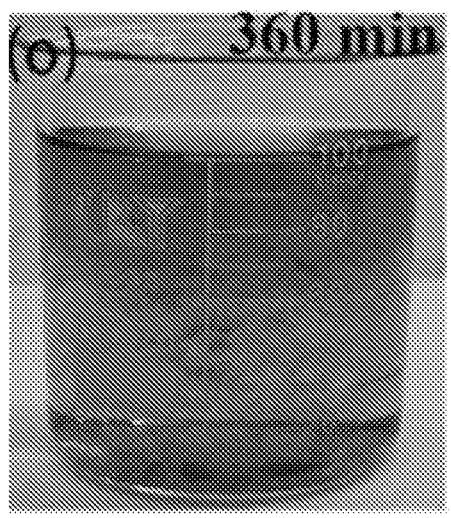

FIG. 13a to FIG. 13b showed the degradability test of the adsorption after humic acid type adsorption material was recycled. The adsorption material which is recycled for many times was soaked in an aqueous solution with pH=8-10, and the humic acid type adsorption material would gradually degrade. FIG. 13a-FIG. 13o were optical photos of swelling and degradation of the adsorption material which was recycled by many times for use after being soaked in a 25° C. aqueous solution with pH=8 at different times.

The above results indicated that the efficient, selectable and degradable humic acid type adsorption material had excellent adsorption capacity for methylene blue dye.

(2) Recycling Performance of Adsorption Material for Methylene Blue Dye

The dried efficient, selectable and degradable humic acid type adsorption material was taken to study the adsorption-desorption on methylene blue dye (MB). Determination of methylene blue dye concentration: an ultraviolet spectrophotometer was used to determine its concentration at a wavelength of 664 nm.

A Removal Rate was Calculated:

$$R\% = \frac{C_0 - C_e}{C_0}$$

Where, R % represented the removal rate, $C_e$ and $C_0$ represented the equilibrium and initial concentration, respectively, and m represented the quality of the adsorption material.

The resulted showed that the efficient, selectable and degradable humic acid type adsorption material had high-efficiency adsorption-desorption capacity for methylene blue dye, and was an excellent recyclable adsorbent for removing methylene blue dye. As shown in FIG. 11, after 5 cycles, the removal rate of methylene blue dropped from 98.75% to 81.52%. The humic acid type adsorption material could fully meet the requirements of actual production, and MB could be removed and recycled from wastewater through simple filtration.

What is claimed is:

1. A preparation method for a humic acid type adsorption material, comprising the following steps:
    step 1: weighing humate, montmorillonite, acrylic acid and carboxymethyl cellulose or salts thereof in a mass ratio of (0.01-0.15): (0.03-0.15): (2-6): (0.05-0.14) to separately prepare a humate solution, a montmorillonite water dispersion solution, an acrylic acid solution and a carboxymethyl cellulose solution or a salt solution thereof;
    step 2: stirring and uniformly mixing the humate solution, the montmorillonite water dispersion solution and the carboxymethyl cellulose solution or the salt solution thereof under a heating condition to form a system A; adding a crosslinking agent into the acrylic acid solution to form a system B;
    step 3: dropping the system B and an initiator into the system A, continuing to stir after the addition is completed, and continuing to stir after the temperature rises to obtain a viscous gel material;
    and step 4: performing freezing-thawing treatment on the viscous gel material obtained in step 3 for several times, and finally freeze-drying to obtain a humic acid type adsorption material
    wherein during the freezing-thawing treatment, the freezing time is 8-12 h, the thawing time is 6-10 h, and the number of freezing-thawing treatment is 3-5.

2. The preparation method for the humic acid type adsorption material according to claim 1, wherein the carboxymethyl cellulose salt is sodium carboxymethyl cellulose or potassium carboxymethyl cellulose, the humate is sodium humate or potassium humate, and the montmorillonite is sodium-based montmorillonite or calcium-based montmorillonite.

3. The preparation method for the humic acid type adsorption material according to claim 1, wherein in step 2, heating to 55-65° C., and the stirring speed is 100-150 r/min.

4. The preparation method for the humic acid type adsorption material according to claim 1, wherein the crosslinking agent is N, N'-methylenebisacrylamide.

5. The preparation method for the humic acid type adsorption material according to claim 1, wherein the initiator is ammonium persulfate or potassium persulfate.

6. The preparation method for the humic acid type adsorption material according to claim 1, wherein in step 3, the first stirring lasts for 20-40 min with a rotation speed of 100-150 r/min at 55-65° C.; and second stirring lasts for 2-4 h with a rotation speed of 100-150 r/min at 70° C.

7. The preparation method for the humic acid type adsorption material according to claim 1, wherein in step 3, a dropping rate of the system B is 3-5 drops/s, and the dropping rate of the initiator is 2-4 drops/s.

\* \* \* \* \*